(12) United States Patent
Kurozuka et al.

(10) Patent No.: US 8,238,223 B2
(45) Date of Patent: Aug. 7, 2012

(54) DEFORMABLE MIRROR, OPTICAL HEAD, AND OPTICAL RECORDING AND PLAYBACK DEVICE

(75) Inventors: Akira Kurozuka, Fujiidera (JP); Yoshihiro Mushika, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1160 days.

(21) Appl. No.: 10/561,926

(22) PCT Filed: Oct. 29, 2004

(86) PCT No.: PCT/JP2004/016466
§ 371 (c)(1),
(2), (4) Date: Dec. 22, 2005

(87) PCT Pub. No.: WO2005/045814
PCT Pub. Date: May 19, 2005

(65) Prior Publication Data
US 2007/0097836 A1 May 3, 2007

(30) Foreign Application Priority Data
Nov. 6, 2003 (JP) ................................. 2003-376857

(51) Int. Cl.
*G11B 7/00* (2006.01)
(52) U.S. Cl. ............. 369/112.29; 359/224.1; 359/199.3; 359/846
(58) Field of Classification Search ............. 369/112.29; 359/224.1, 199.3, 846
See application file for complete search history.

(56) References Cited

U.S. PATENT DOCUMENTS

| 5,719,846 | A | 2/1998 | Matoba et al. |
| 6,418,108 | B1 | 7/2002 | Ueda et al. |
| 2006/0187563 | A1* | 8/2006 | Nishioka et al. ............. 359/846 |

FOREIGN PATENT DOCUMENTS

| JP | 52-105326 | 9/1977 |
| JP | 2-291630 | 12/1990 |
| JP | 2-291631 | 12/1990 |

(Continued)

OTHER PUBLICATIONS

Japanese Office Action issued Aug. 3, 2010 in corresponding Japanese Application No. 2005-515326. (English Translation).

(Continued)

*Primary Examiner* — Latanya Bibbins
(74) *Attorney, Agent, or Firm* — Wenderoth, Lind & Ponack, L.L.P.

(57) ABSTRACT

For a recording and playback optical head used for a dual layer disc, it is difficult to reduce the size and the cost due to the need to correct spherical aberration caused by a difference in thickness of a light-transmitting layer.
A reflection mirror having a reflection surface on which light is reflected and provided with a member having ferromagnetism at the center, and a switching device that switches between a deformed state and a non-deformed state of the reflection mirror using a magnetic force are provided. The switching device includes a hard magnetic member, and a magnetizing member that magnetizes and demagnetizes the hard magnetic member. When light is concentrated on a first recording layer farther from the light-incident surface, the reflection mirror is used as a plane mirror, and when light is concentrated on a second recording layer closer to the light-incident surface, the reflection mirror is deformed in the shape of a concave surface by means of the switching device.

23 Claims, 16 Drawing Sheets

FOREIGN PATENT DOCUMENTS

| | | |
|---|---|---|
| JP | 5-249307 | 9/1993 |
| JP | 6-17959 | 1/1994 |
| JP | 6-20829 | 1/1994 |
| JP | 7-320615 | 12/1995 |
| JP | 8-334708 | 12/1996 |
| JP | 9-259459 | 10/1997 |
| JP | 2003-67969 | 3/2003 |
| JP | 2003-75747 | 3/2003 |
| JP | 2003067969 A * | 3/2003 |

OTHER PUBLICATIONS

Japanese Office Action issued Dec. 21, 2010 in corresponding Japanese patent application No. 2005-515326 (English language translation provided).

* cited by examiner

DEFORMABLE MIRROR, OPTICAL HEAD, AND OPTICAL RECORDING AND PLAYBACK DEVICE

FIELD OF THE INVENTION

The present invention relates to an optical head that records/plays back information in/from an optical recording and playback medium, and more particularly, to a deformable mirror for use in an optical head that corrects spherical aberration occurring with a change in thickness of a light-transmitting layer in an optical recording and playback medium having two recording layers, and an optical head and an optical recording and playback device using the same.

DESCRIPTION OF THE RELATED ART

Optical recording and playback media, such as a playback-only optical disc, a phase-change optical disc, and a magneto-optical disc, have been used extensively to save video information, sound information, computer data, or the like. The optical recording and playback media are now used as video recording media as an alternative to videotapes, and further as recoding media for high-density videos. The need for information recoding media to increase a recording density and a capacity has been therefore increasing in recent years.

Meanwhile, the improvement of a recording density has enabled a small-diameter disc to be used in a mobile device, such as a video camera, and there is a need for an optical head to be reduced in size, power consumption, and cost, so that it can be installed in a mobile device.

In order to increase a recording density of such information recording media, the spot diameter of light concentrated by the objective lens is made smaller by increasing the numerical aperture, NA, of the objective lens installed in the optical head and making the wavelength, $\lambda$, of light from the light source shorter, while more than one recording layer to record information is provided.

For example, in the case of a CD (Compact Disc), the numerical aperture, NA, of the objective lens is 0.45 and the wavelength of light emitted from the light source is 780 nm, whereas in the case of a DVD having a higher recording density and a larger capacity, the numerical aperture, NA, of the objective lens is 0.6 and the wavelength of light is 650 nm.

Aberration caused by a tilt of a disc with respect to the optical axis, for example, becomes larger as the wavelength of light becomes shorter. Hence, in order to obtain a satisfactory light spot when a light source that emits light having a shorter wavelength is used, it is effective to make the light-transmitting layer thinner so that the aberration is cancelled out. It is for this reason that the thickness of the light-transmitting layer is 1.2 mm in a CD whereas it is 0.6 mm in a DVD.

Incidentally, a dual layer disc achieving double the capacity of a single disc by having two recording layers is now put into practical use as a playback-only DVD.

In the dual layer disc, 0.055 mm is given as an interval between the two recording layers to prevent inter-layer cross talks. Generally, spherical aberration occurs in collected light with a change in thickness of the light-transmitting layer and a light spot is deteriorated. In the case of the dual layer disc, however, the thickness of the light-transmitting layer is, for example, 0.6 mm for one recording layer and 0.545 mm for the other recording layer, and a difference in thickness is suppressed to be small. Spherical aberration is thus controlled to occur within an allowable range.

On the other hand, in order to further increase a density, the use of a disc with the light-transmitting layer having a thickness on the order of 0.1 mm is now being considered by setting the numerical aperture, NA, of the objective lens to 0.85 and the wavelength of light to 405 nm. When a dual layer disc is formed using such a disc, it is necessary to have an interval on the order of 0.025 mm between the two layers, which determines the thickness of the light-transmitting layer to be, for example, 0.1 mm for one recording layer and 0.075 mm for the other recording layer. Spherical aberration occurring due to a difference in thickness of the light-transmitting layer is therefore no longer allowable.

Such being the case, various methods for correcting spherical aberration occurring with the thickness of the light-transmitting layer have been proposed.

For example, JP-A-9-152505 discloses a method for correcting spherical aberration by deforming a thin-film mirror to which a tensile force is provided, using an electrostatic force or the like.

Also, JP-A-11-259893 discloses that spherical aberration is corrected by varying NA on the light-incident side of the objective lens by changing a divergence angle of a parallel beam that comes incident on the objective lens by moving a collimator lens disposed between the light source and the objective lens.

These methods in the background art, however, have problems as follows.

Firstly, the configuration to deform the thin-film mirror increases the cost, because it is quite difficult to manufacture the mirror having a satisfactory flat surface in the initial state. In addition, when a sufficiently high initial tensile force is provided to the thin-film mirror so that the flatness can be maintained regardless of a change in environmental temperature, an extremely large electrostatic force is necessary to deform the mirror, which requires the driving at a high voltage.

Further, it is necessary to keep applying a voltage to maintain the thin-film mirror in a deformed state. Hence, the power consumption is so large that this method is not suitable in a case where a quantity of correction for spherical aberration is changed between two recording layers.

Secondly, in the case of the configuration to move the collimator lens, the optical head cannot be reduced in size due to the need for the moving span for the lens, the guiding structure, and a space to dispose a driving actuator or the like on the optical path in the optical system.

In addition, because the collimator lens cannot be disposed in close proximity to the objective lens, when the device is configured in such a manner that a divergence angle of a parallel beam is changed with movements of the collimator lens, efficiency for utilization of a laser beam and the rim intensity (an intensity ratio at the edge of pupil on the assumption that the maximum point of intensity at the entrance pupil is 100%) vary considerably with a distance from the objective lens. This makes it difficult to design the optical system.

BRIEF SUMMARY OF THE INVENTION

The invention has an object to provide a deformable mirror that solves the problems discussed above and has a simple structure by which spherical aberration is switched in response to a change in thickness of the light-transmitting layer for two recording layers, and further to provide compact, low-power, and inexpensive optical head and optical recording and playback device that can be installed in a mobile device.

In order to achieve the above object, the invention provides a deformable mirror that includes a reflection mirror having a reflection surface on which light is reflected, at least part of which is made of a member having ferromagnetism, and a switching device that switches between a deformed state and a non-deformed state of the reflection mirror using a magnetic force. The switching device includes a hard magnetic member and a magnetizing member that magnetizes and demagnetizes the hard magnetic member.

It is preferable to configure the deformable mirror in such a manner that the reflection mirror is brought into the deformed state by attracting the member having ferromagnetism in the reflection mirror as the hard magnetic member is magnetized by the magnetizing member, and the reflection mirror is restored to the non-deformed state as the hard magnetic member is demagnetized by the magnetizing member.

The magnetizing member may include a yoke, a magnetizing coil, and a sub-coil.

It is preferable that at least part of the sub-coil and the yoke is disposed on a back surface and a side portion of the reflection mirror.

Also, the deformable mirror, including a reflection mirror having a reflection surface on which light is reflected, at least part of which is made of a member having ferromagnetism, and a switching device that switches between a deformed state and a non-deformed state of the reflection mirror using a magnetic force, may be configured in such a manner that the switching device includes a permanent magnet, and a movable mechanism that moves the permanent magnet between a first position at which a magnetic force acts on the reflection mirror and a second position spaced apart farther from the member having ferromagnetism than the first position.

It is preferable to configure the deformable mirror in such a manner that the movable mechanism brings the reflection mirror into the deformed state by attracting the member having ferromagnetism by moving the permanent magnet present at the second position to the first position, and restores the reflection mirror to the non-deformed state by moving the permanent magnet present at the first position to the second position.

The movable mechanism may be formed to include a movable portion that supports the permanent magnet, a fixing portion that supports the movable portion rotatably, and a driving portion that activates the movable portion to rotate between the first position and the second position.

It is preferable that at least part of the driving portion is disposed on a side portion of the reflection mirror.

It is preferable that the driving portion includes a yoke that attracts the permanent magnet present at the second position, a driving coil attached to the yoke, and a driving magnet.

The reflection mirror may be formed to include a base member formed of a glass plate, and the member having ferromagnetism is provided to at least part of the base member.

The reflection mirror may be formed using a plate material having ferromagnetism as a base member.

It is preferable that the member having ferromagnetism together with the yoke forms part of a magnetic circuit.

It is preferable that the reflection surface is formed of a reflection coating provided on a surface of the base member.

It is preferable that the reflection coating is formed of a dielectric multi-layer film.

The reflection coating may be provided on each of both surfaces of the base member.

It may be configured in such a manner that the reflection coating is provided on one surface of the base member, and a counter coating, having a coefficient of thermal expansion same as a coefficient of thermal expansion of the reflection coating, is formed on the other surface of the base member.

The member having ferromagnetism may be made of a hard magnetic material.

It is preferable that a base, and a holding member supported on the base are further provided, and that the reflection mirror is held elastically by the holding member, while the switching device is incorporated into the base.

It is preferable that the base is provided with a recessed portion that is recessed in a deforming direction of the reflection mirror, and that the reflection mirror is configured to be held so as to cover the recessed portion in the base, and maintained in the deformed state by abutting on the recessed portion when deformed by means of the switching device.

It is preferable that the reflection mirror is formed in almost an elliptical shape, and that the recessed portion in the base is formed in almost an elliptical shape adjusted to a shape of the reflection mirror.

The holding member may be formed to press the reflection mirror toward the base with a spring force.

It is preferable that the holding member includes a base portion incorporated into the base, a blade spring portion extending from the base portion, and a presser frame portion connected to the blade spring portion and pressing down the reflection mirror.

The holding member may be made of an elastic adhesive.

The invention also provides an optical head configured to concentrate light on an optical information recording medium. The optical head includes an objective lens that concentrate light on the optical information recording medium, an objective lens actuator that drives the objective lens, and the deformable mirror described above. The deformable mirror is disposed to reflect light emitted from a light source toward the objective lens.

In this case, it is preferable that the deformable mirror is provided in a space below the objective lens actuator.

The invention further provides an optical recording and playback device that concentrates light on an optical recording and playback medium having two recording layers and performs at least one of recording information in and reading recorded information from the optical recording and playback medium. The optical recording and playback device includes the optical head described above, and a feeding portion that supplies the optical head with power needed to switch the states of the reflection mirror.

In this case, it is preferable that the deformable mirror uses the reflection mirror as a plane mirror when light is concentrated on a first recording layer farther from a light-incident surface, and deforms the reflection mirror to be a concave mirror with the reflection surface forming a concave surface when light is concentrated on a second recording layer closer to the light-incident surface.

It is preferable that the feeding portion applies a pulse of voltage only when the states of the reflection mirror are switched.

When configured in this manner, a deformable mirror that corrects spherical aberration using a simple configuration can be achieved, and compact, low-power optical head and optical recording and playback device can be also achieved.

According to the deformable mirror of the invention, a deformable mirror that corrects spherical aberration, caused by a difference in thickness of the light-transmitting layer in a dual layer disc, using a simple configuration at a low cost can be provided, and a compact optical head can be thereby achieved.

In addition, because it is configured in such a manner that a divergence angle of a parallel beam can be switched in the vicinity of the objective lens, a change in efficiency for utilization of a laser beam and in the rim intensity can be suppressed, which makes it easy to design the optical system.

Moreover, in order to correct spherical aberration, a current is passed through for a short time only when two layers are switched. Hence, power consumption needed for correction can be reduced to the minimum.

Hence, because power consumption is low, it is possible to achieve compact, low-power, and inexpensive optical head and optical recording and playback device that can be installed in a mobile device.

DETAILED DESCRIPTION OF THE INVENTION

Hereinafter, embodiments of the invention will be described with reference to the drawings.

First Embodiment

Figure 1:
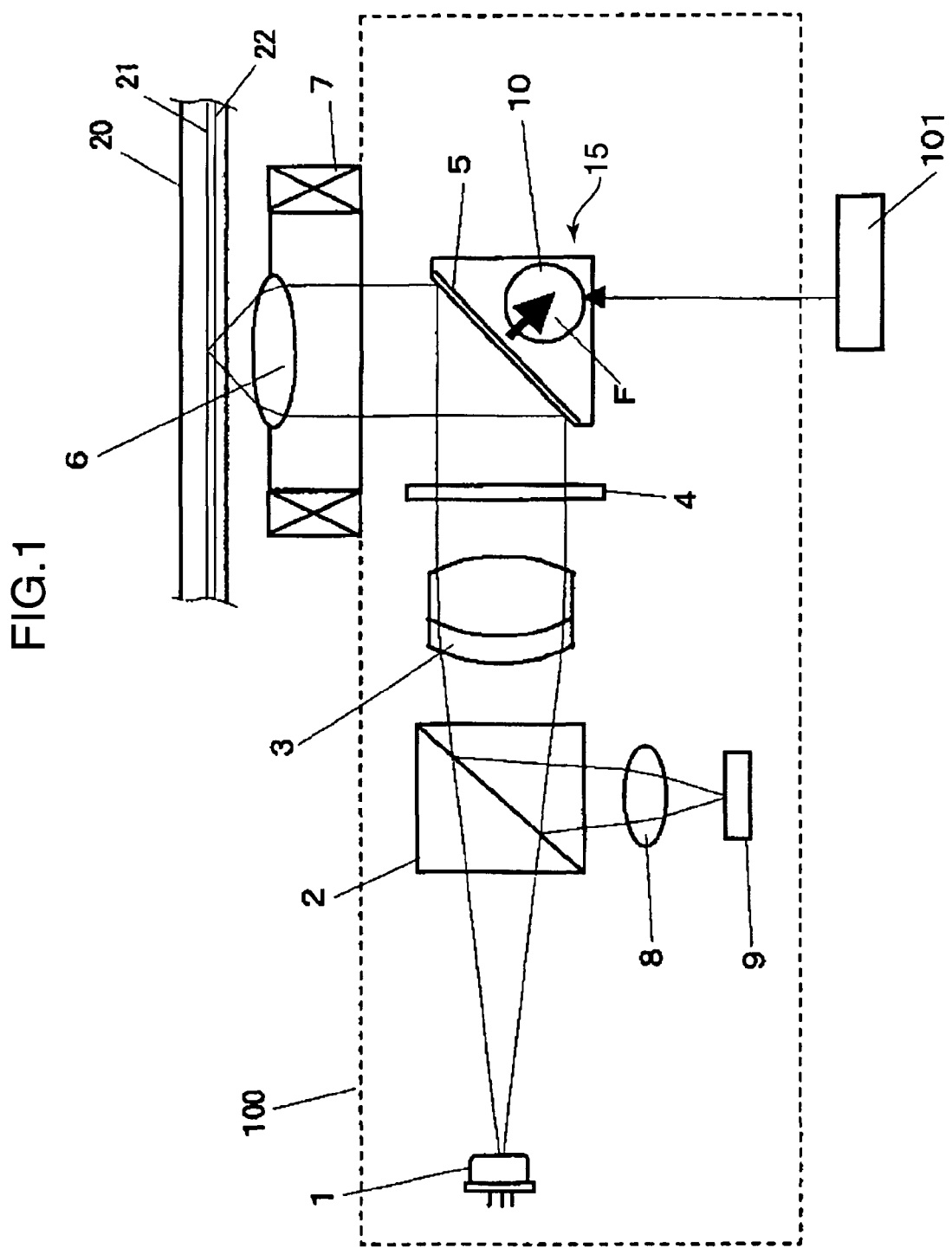
FIG. 1 is a view schematically showing the configuration of an optical head according to a first embodiment of the invention.

FIG. 1 is a schematic view showing the configuration of an optical head according to a first embodiment of the invention.

As is shown in FIG. 1, an optical head 100 includes a laser light source 1, a polarization beam splitter 2, a collimator lens 3, a quarter-wave plate 4, a deformable mirror 15 having a reflection mirror 5, an objective lens 6, a collective lens 8, and a photo-detector 9. The laser light source 1 emits a laser beam. The polarization beam splitter 2 transmits a laser beam that comes incident on one side while reflecting a laser beam that comes incident on the other side.

The quarter-wave plate 4 converts a polarization direction of light. The reflection mirror 5 deflects the optical axis direction. The objective lens 6 concentrates leaser beams on the information recording surface of a dual layer optical disc 20. The collective lens 8 collects reflected light from the dual layer optical disc 20 on a light-reception portion in the photo-detector 9.

In the optical head 100, a laser beam emitted from the laser light source 1 passes through the polarization beam splitter 2, after which it is shaped into a parallel beam in the collimator lens 3. The parallel beam then passes through the quarter-wave plate 4, returns from the reflection mirror 5 in a direction at 90 degrees to be collected in the objective lens 6, and comes into a focus on the information recording surface of the dual layer optical disc 20. Reflected light of a laser beam reflected on the information recording surface of the dual layer optical disc 20 passes through the objective lens 6, the reflection mirror 5, the quarter-wave plate 4, the collimator lens 3, and the polarization beam splitter 2 in this order, and forms an image on the photo-detector 9 via the collective lens 8.

The objective lens 6 is mounted on a biaxial actuator 7, and performs the focus servo operation and the tracking servo operation with respect to the dual layer optical disc 20 on the basis of a servo signal obtained from the photo-detector 9.

The dual layer optical disc 20 and the deformable mirror 15 will now be described with reference to FIG. 2 and FIG. 3.

Figure 2:
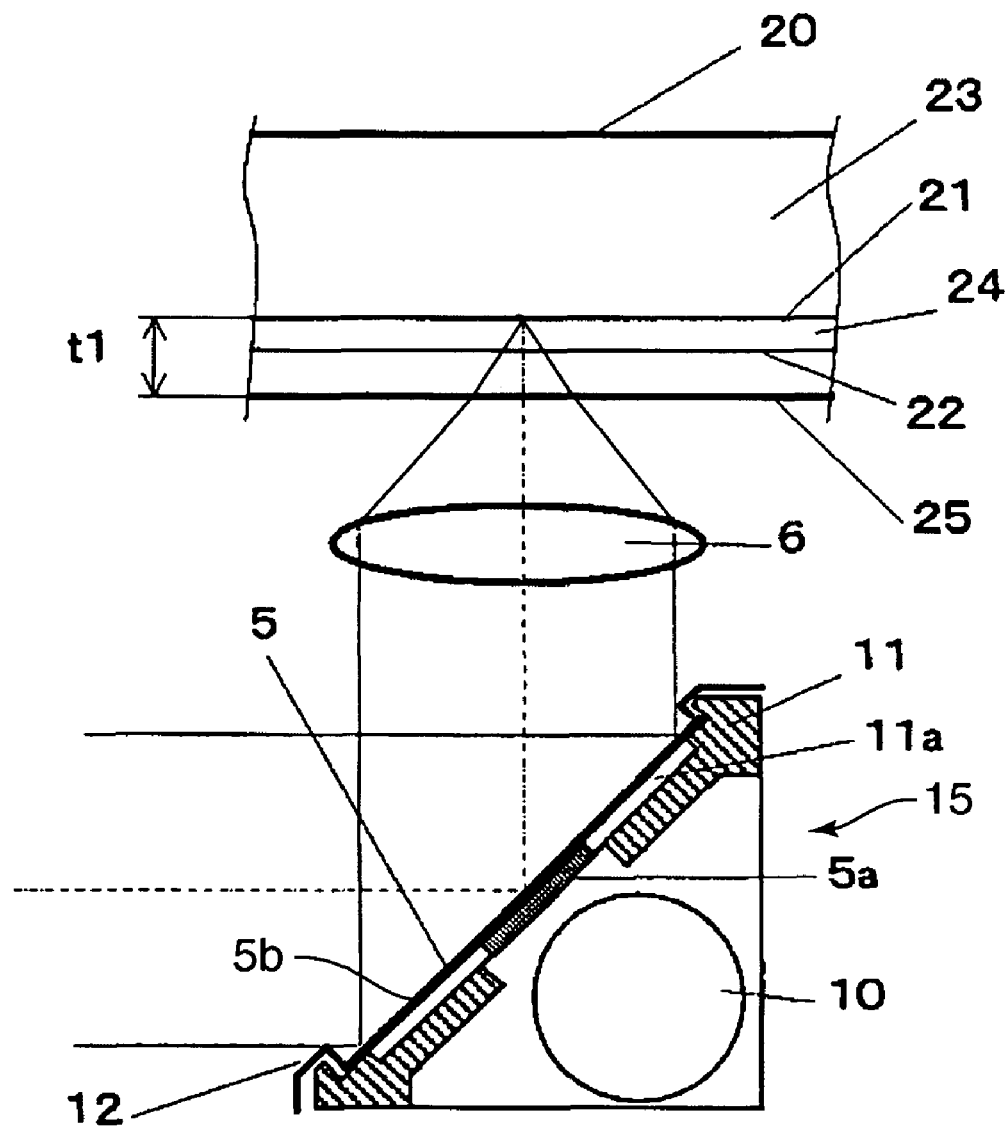
FIG. 2 is a side elevation showing a state where light is concentrated on a first recording layer in a dual layer optical disc using the optical head.
Figure 3:
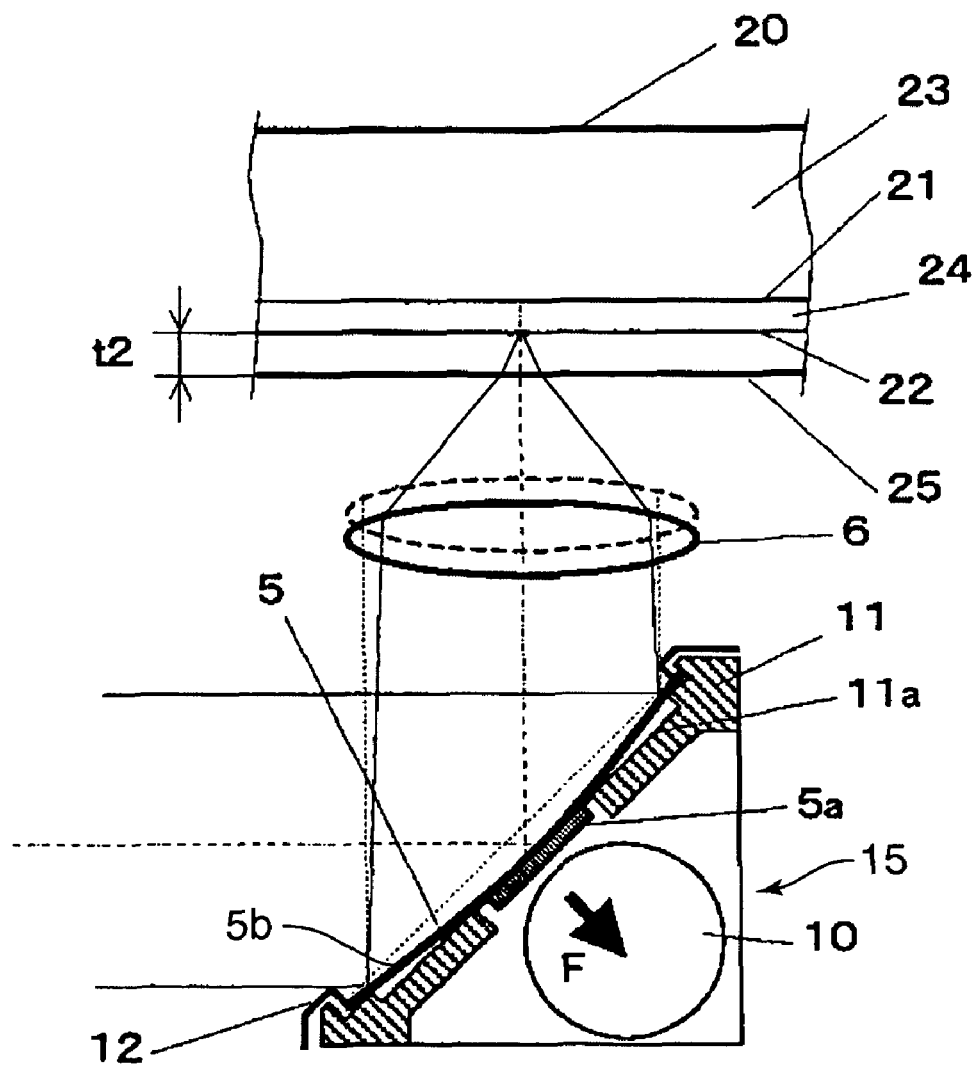
FIG. 3 is a side elevation showing a state where light is concentrated on a second recording layer in a dual layer optical disc using the optical head.

FIG. 2 is a side elevation showing a state where light is concentrated on a first recording layer 21 in the dual layer optical disc 20, and FIG. 3 is a side elevation showing a state where light is concentrated on a second recording layer 22 in the dual layer optical disc 20.

The dual layer optical disc 20 is of a structure in which the first recording layer 21 is provided on the surface of a substrate 23, the second recording layer 22 is provided on the surface of the first recording layer 21 with an intermediate layer 24 in between, and a cover layer 25 is further layered on the surface of the second recording layer 22.

By using a laser having a wavelength of 405 nm and the numerical aperture, NA, of 0.85 for a 4.7-GB DVD having a diameter of 12 cm, a recording capacity achieved is about 25 GB per layer, and about 50 GB in total of two layers.

In such a disc, the thickness of the light-transmitting layer is 0.1 mm in order to suppress aberration occurring due to a tilt of the disc with respect to the optical axis to as low a level as that in a DVD. In the case of a single layer disc, because the thickness of the cover layer 25 is the thickness of the light-transmitting layer, a 0.1-mm-thick cover layer 25 is provided. Whereas in the case of a dual layer disc, because the intermediate layer 24 needs a thickness of 0.025 mm, the thickness of the cover layer 25 is 0.075 mm. To be more specific, when light is collected on the first recording layer 21, because the light-transmitting layer comprises the cover layer 25 and the intermediate layer 24, the thickness of the light transmitting layer is t1=0.1 mm, and when light is collected on the second recording layer 22, the thickness of the cover layer 25 is t2=0.075 mm.

Meanwhile, the deformable mirror 15 includes the reflection mirror 5. The reflection mirror 5 is a thin-plate-shaped mirror, and formed, for example, by using a glass substrate having a thickness on the order of 0.1 mm as a base member 5b and applying a reflection coating on the surface of the base member 5b. The surface of the reflection coating forms the reflection surface on which light is reflected. The thickness or the like of the base member 5b is set in such a manner that, under natural conditions where no external force is applied, a laser beam is not disturbed when reflected, a satisfactory flatness is maintained, and the base member 5b undergoes deformation at a predetermined force.

For example, by setting the thickness of the glass substrate in a range from 0.05 mm to 0.2 mm for a beam diameter on the order of 3 to 4 mm, the flatness can be maintained unless an external force is applied, and the glass substrate can be deformed as needed to correct aberration at up to an allowable stress. The reflection mirror 5 will not undergo deformation due to its own weight alone. Hence, the reflection mirror 5 is different from the one comprising a thin film in that there is no need to keep providing a tensile force in maintaining the flatness.

In order to achieve satisfactory reflectance of 99% or higher, a dielectric multi-layer film is used as the reflection coating. The number of layers and the kinds of the dielectric material in the dielectric multi-layer film can be chosen as needed to best suit the wavelength of light, reflectance, etc.

Because a coefficient of thermal expansion differs between the base member and the coating film of the mirror, warping of the reflection mirror 5 poses a problem when the base member is thin. In this case, it is preferable to provide the reflection coating on the both surfaces of the mirror, or to provide the reflection coating on the front surface side and a counter coating having a coefficient of thermal expansion same as that of the reflection coating on the back surface side. When configured in this manner, it is easy to keep a stress balance, which in turn makes it difficult for warping to occur.

The reflection mirror 5 is disposed to cover a recessed portion 11a provided in a base 11. The outer circumference portion of the reflection mirror 5 is held by an elastic member 12 so as not to fall off.

The reflection mirror 5 is provided with a magnetic member 5a having ferromagnetism. The magnetic member 5a is provided at the center of the back surface of the base member 5b. A method of providing the magnetic member 5a includes a method by which a magnetic stainless steel plate or a silicon steel plate is bonded, a method by which a magnetic film of iron-base oxide or the like is formed by means of sputtering or vacuum evaporation, a method by which magnetic powder is applied, etc.

A switching device 10 is provided behind the reflection mirror 5. When a current is passed through the switching device 10 by means of a driving circuit 101, a magnetic attraction force F is induced by the fact that the hard magnetic member 10a becomes magnetized, and the reflection mirror 5 is deformed in such a manner that the reflection surface forms a concave surface. When the attraction force F is removed by the fact that the hard magnetic member 10a becomes demagnetized, the reflection mirror 5 restores to the original plane mirror. For example, when an attraction force of 0.098 to 0.147 N (10 to 15 gf) is induced with respect to a 0.1-mm-thick glass mirror, deformation such that causes the apex (the center of the reflection mirror 5) to be displaced by about 4 μm is achieved.

As is shown in FIG. 2, the optical system in the optical head of this embodiment is designed to obtain a satisfactory light spot by concentrating light on the first recording layer 21 by means of the reflection mirror 5 in a non-deformed state where it remains in the shape of a flat plate, for the light to pass through the light-transmitting layer having t1=0.1 mm.

In order to switch the collection of light to be performed on the second recording layer 22 as is shown in FIG. 3 in the optical system described as above, the objective lens 6 is moved downward first by providing an offset to a focus signal, and then the beam spot positioning is performed again on the second recording layer 22. In this instance, spherical aberration occurs because the thickness of the light-transmitting layer is reduced to t2=0.075 mm.

In order to correct the spherical aberration, an attraction force is induced in the switching device 10 by means of the driving circuit 101 for the reflection mirror 5 to undergo deformation until it forms a concave surface, so that a parallel beam that comes incident on the objective lens 6 is converted to converged light. Spherical aberration caused by a difference in thickness of the light-transmitting layer can be thus corrected.

A degree at which a parallel beam is converged is determined by deforming the reflection mirror 5 by a quantity of deformation pre-set in response to a difference (thickness of the intermediate layer 24) of the light-transmitting layer. A quantity of deformation of the reflection mirror 5 is limited by the recessed portion 11a in the base 11. A constant quantity of deformation is maintained by providing an attraction force F sufficient for the reflection mirror 5 to be kept abutting on the recessed portion 11a.

A quantity of deformation of the reflection mirror 5 takes a value that matches with the depth of the recessed portion 11a. The depth of the recessed portion 11a is determined optically from a difference in thickness of the light-transmitting layer, NA of the objective lens 6, etc. A step on the order of a few micrometers forming the recessed portion 11a needs to be formed precisely with a margin of error of ±10%.

In order to form a fine step forming the recessed portion 11a precisely, the surface of the base 11 that supports the reflection mirror 5 is polished to a mirror-smooth state. In addition, a method of forming the step includes a method by which a step is provided by cutting out a region corresponding to the recessed portion 11a by means of etching or the like, or conversely, a method by which a step is formed by thickening the outer circumferential portion of the base 11 by means of electroless nickel plating or the like. Alternatively, there is a method by which the recessed portion 11a is formed as a flat mirror surface while thickening the back surface side of the outer circumferential portion of the reflection mirror 5 in the form of a step having a predetermined height.

When the reflection mirror 5 is deformed until the reflection surface forms a concave surface, a portion present on the outer circumferential side from the recessed portion 11a is displaced in a direction to move away from the base 11. In this instance, because the outer circumferential portion of the reflection mirror 5 is elastically held by the elastic member 12, the reflection mirror 5 naturally undergoes deformation to form a curved surface, and the entire mirror is thereby shaped like a concave surface.

When the outer circumferential portion of the reflection mirror 5 is fixed immovably to the base 11, the outer circumferential portion will not be displaced. In this case, a region that is deformed in the shape of a concave surface becomes smaller. As a result, a relatively larger mirror is required.

On the contrary, in this embodiment, the outer edge portion of the reflection mirror 5 is supported by means of the elastic member 12 so that it can be displaced with respect to the base 11. Hence, the reflection mirror 5 can be compact. In addition, in comparison with a case where the outer circumferential portion is fixed immovably to the base 11, a predetermined quantity of deformation can be achieved with a smaller attraction force, and a stress induced in the reflection mirror 5 can be suppressed to be smaller.

It is thus preferable to support the outer circumferential portion of the reflection mirror 5 elastically by means of the elastic member 12 as in the invention.

The configuration of the deformable mirror 15 of the invention will now be described more concretely.

Figure 4:
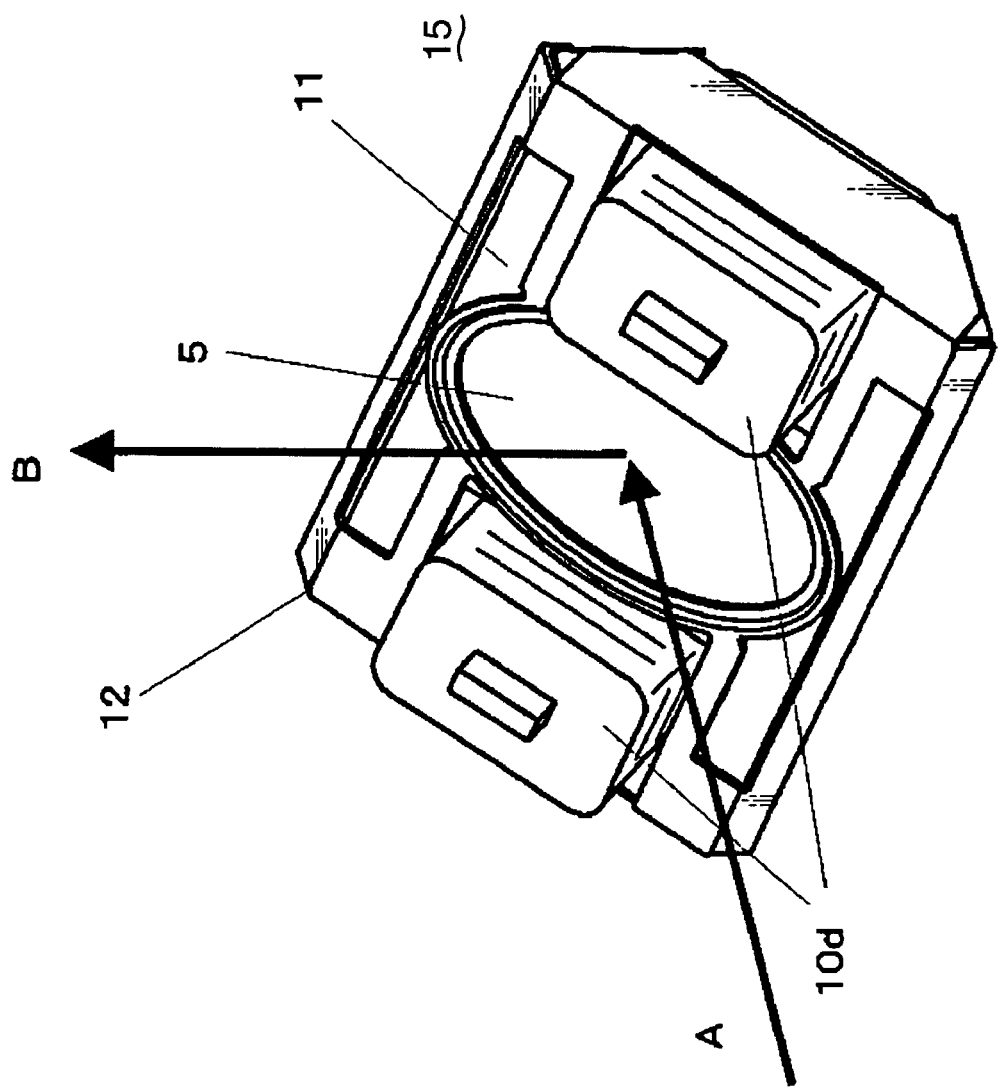
FIG. 4 is a perspective view showing the overall configuration of a deformable mirror provided in the optical head.
Figure 5:
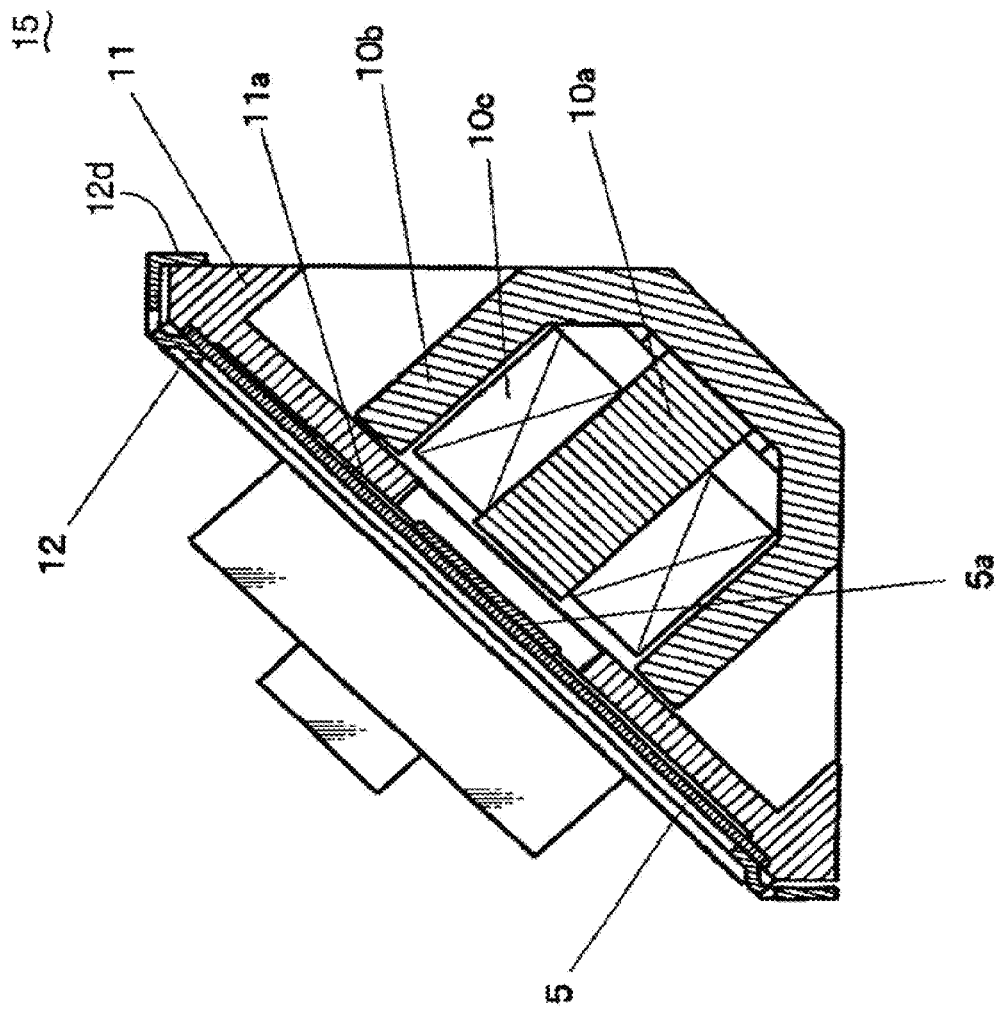
FIG. 5 is a cross section of the deformable mirror.

FIG. 4 is a perspective view showing the configuration of the deformable mirror 15 of the invention. FIG. 5 is a cross section and FIG. 6 is an exploded perspective view.

Figure 6:
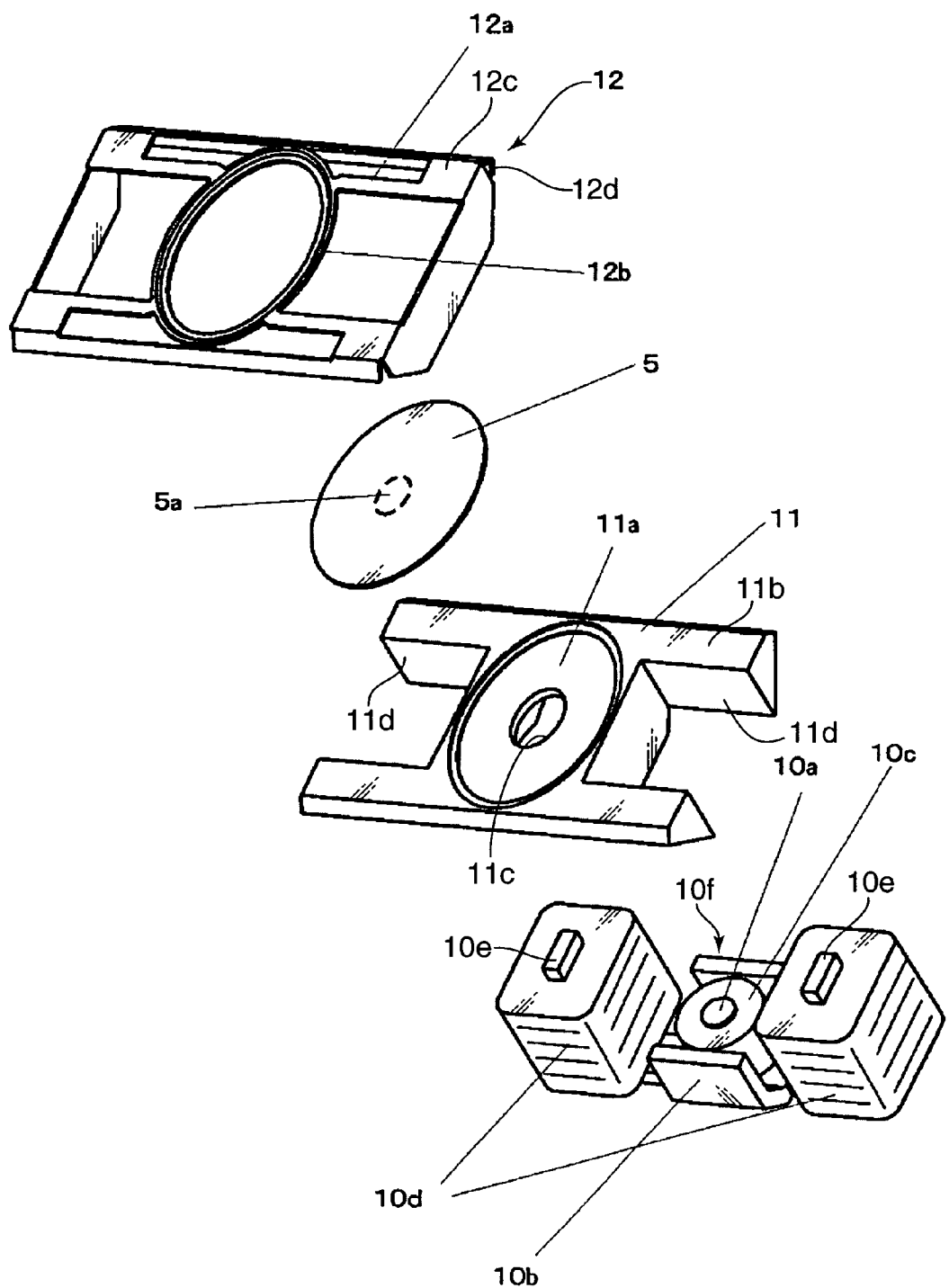
FIG. 6 is a perspective view showing disassembled respective components forming the deformable mirror.

Referring to FIG. 4 through FIG. 6, the reflection mirror 5 is provided to the base 11 so as to cover the recessed portion 11a, and is held by the elastic supporting member 12. The magnetic member 5a having ferromagnetism is provided on the back surface of the reflection mirror 5.

In other words, the deformable mirror 15 includes the base 11, the holding member 12 supported on the base 11, the reflection mirror 5 held elastically by the holding member 12 and having the reflection surface on which light is reflected, and the switching device 10 that switches between a deformed state and a non-deformed state of the reflection mirror 5.

As is indicated by an arrow A of FIG. 4, a circular laser beam goes incident on the reflection mirror 5 in a direction at 45 degrees, returns at 90 degrees to be reflected in a direction indicated by an arrow B, and goes incident on the objective lens 6 disposed above. Hence, the cross section of the beam that goes incident on the reflection mirror 5 is elliptical, and the reflection mirror 5 is accordingly of an elliptical shape.

The base 11 includes a main body 11b in the shape of a horizontally long block having a top surface tilted with respect to the bottom surface, and the recessed portion 11a provided in the main body portion 11b. The recessed portion 11a is provided at the center of the top surface of the main body portion 11b. As has been described, the recessed portion 11a is provided in an elliptical shape, and is formed to have a constant depth all across. The elliptical shape is a shape such that becomes circular when viewed from the side.

The recessed portion 11a is provided with a through-hole 11c that penetrates through the top surface to the back surface. The through-hole 11c is made in a size large enough for the magnetic member 5a of the reflection mirror 5 to get in.

As is shown in FIG. 6, notch portions 11d are provided to the both end portions of the main body portion 11b in the length direction. In other words, the notch portions 11d are provided to the both sides of the recessed portion 11a. Each notch portion 11d is made to have a rectangular cross section, and is of a size large enough to accommodate a sub-coil 10d described below.

The elastic supporting member 12 is a member obtained by pressing a thin metal plate, and comprises a base portion 12c, blade spring portions 12a, and a presser frame portion 12b that are formed integrally. The elastic supporting member 12 can be made of, for example, spring steel, stainless steel, etc.

The base portion 12c is formed in the shape of a rectangular frame attached to the main body portion 11b of the base 11, and includes claw portions 12d that pinch the main body portion 11b from the both sides. This configuration allows the elastic supporting member 12 to engage with the base 11.

The blade spring portions 12a extend inward from the respective four corners of the base portion 12c. Each blade spring portion 12a is able to undergo elastic deformation in the thickness direction.

The presser frame portion 12b is formed to have the circumference of an elliptical shape that goes along the outer periphery portion of the reflection mirror 5, and connects the tip end portions (inner edge portions) of the respective blade spring portions 12a.

When the elastic supporting member 12 formed in this manner is attached to the base 11, the claw portions 12d engage with the main body portion 11b, which brings the base portion 12c of the elastic supporting member 12 into position. Under these conditions, the blade spring portions 12a bend slightly, and the presser frame portion 12b thereby holds the reflection mirror 5 by pressing it down.

The deformable mirror 15 includes the switching device 10 that switches the reflection mirror 5 to the deformed state from the non-deformed state and vice versa. The switching device 10 includes a hard magnetic member 10a and a magnetizing member 10f.

The hard magnetic member 10a is a member made of a hard magnetic material having a strong coercive force, and is incorporated into the base 11. The hard magnetic member 10a is disposed in the back of the through-hole 11c in the base 11 in such a manner that the tip end thereof opposes the magnetic member 5a.

The magnetizing member 10f includes a yoke 10b affixed to the hard magnetic member 10a and a magnetizing coil 10c wound around the hard magnetic member 10a.

When a current is passed through the magnetizing coil 10c, a predetermined magnetomotive force is induced, so that the hard magnetic member 10a is magnetized or demagnetized.

Once the hard magnetic member 10a is magnetized, it holds the magnetic field after the current passing through the magnetizing coil 10c is stopped, and attracts the magnetic member 5a by providing a predetermined flux density.

In this instance, the magnetic member 5a is attracted until the back surface of the reflection mirror 5 abuts on the recessed portion 11a in the base 11, which brings the reflection mirror 5 into a deformed state where it abuts on the recessed portion 11a. The reflection mirror 5 is thereby maintained in the shape of a curved surface with the reflection surface forming a concave surface at a constant quantity of deformation.

When the hard magnetic member 10a is magnetized, a voltage pulse sufficient to induce a necessary magnetic field is applied to the magnetizing coil 10c. A quantity of displacements of the magnetic member 5a is on the order of a few micrometers, and magnetization and demagnetization enabling the switching between the deformed state and the non-deformed state are thought to be achieved by providing a voltage pulse on the order of 10 to several tens volts.

When the magnetized hard magnetic member 10a is demagnetized, a method by which magnetization is removed completely by applying a gradually attenuating alternating voltage to the magnetizing coil 10c, and a method by which the residual flux is reduced to almost zero by applying an inverse voltage lower than the magnetizing voltage are applicable.

Figure 7:
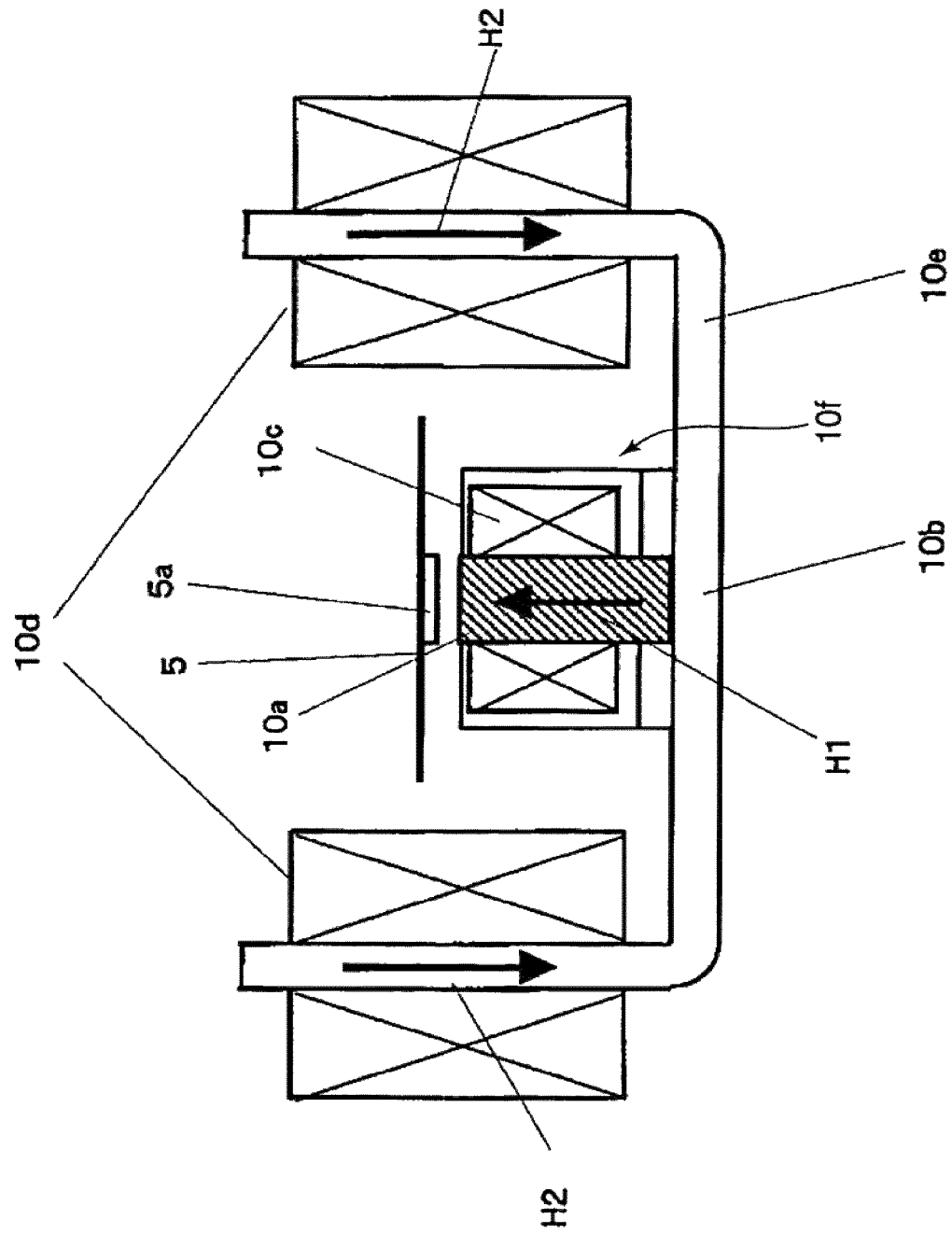
FIG. 7 is a view used to describe a function of sub-coils.

As is shown in FIG. 7, the yoke 10b is extended to the both side portions of the base 11, and sub-coils 10d are provided respectively to both extended portions 10e of the yoke 10b.

FIG. 7 shows a positional relation of the sub-coils 10d. As is shown in the drawing, the magnetizing coil 10c generates a magnetic field, for example, in a direction of a magnetic field H1 at the time of magnetization, whereas a current is passed through the sub-coils 10d wound around the yoke extended portions 10e so that they generate magnetic fields in a direction of H2. In other words, a current is passed through the sub-coils 10d in such a manner that the magnetic field H1 generated by the magnetizing coil 10c is increased in strength via the yoke 10b and the yoke extended portions 10e.

This configuration makes it possible to achieve a larger magnetomotive force at a lower voltage in comparison with a case where the magnetizing coil 10c alone is provided.

A space in which the sub-coils 10d are disposed is located directly below the biaxial actuator 7 of the objective lens 6 provided above. Thus, by forming the deformable mirror 15 in such a manner that the sub-coils 10d are of a size comparable to the biaxial actuator 7 in width, the optical head will not be increased in size.

Figure 8:
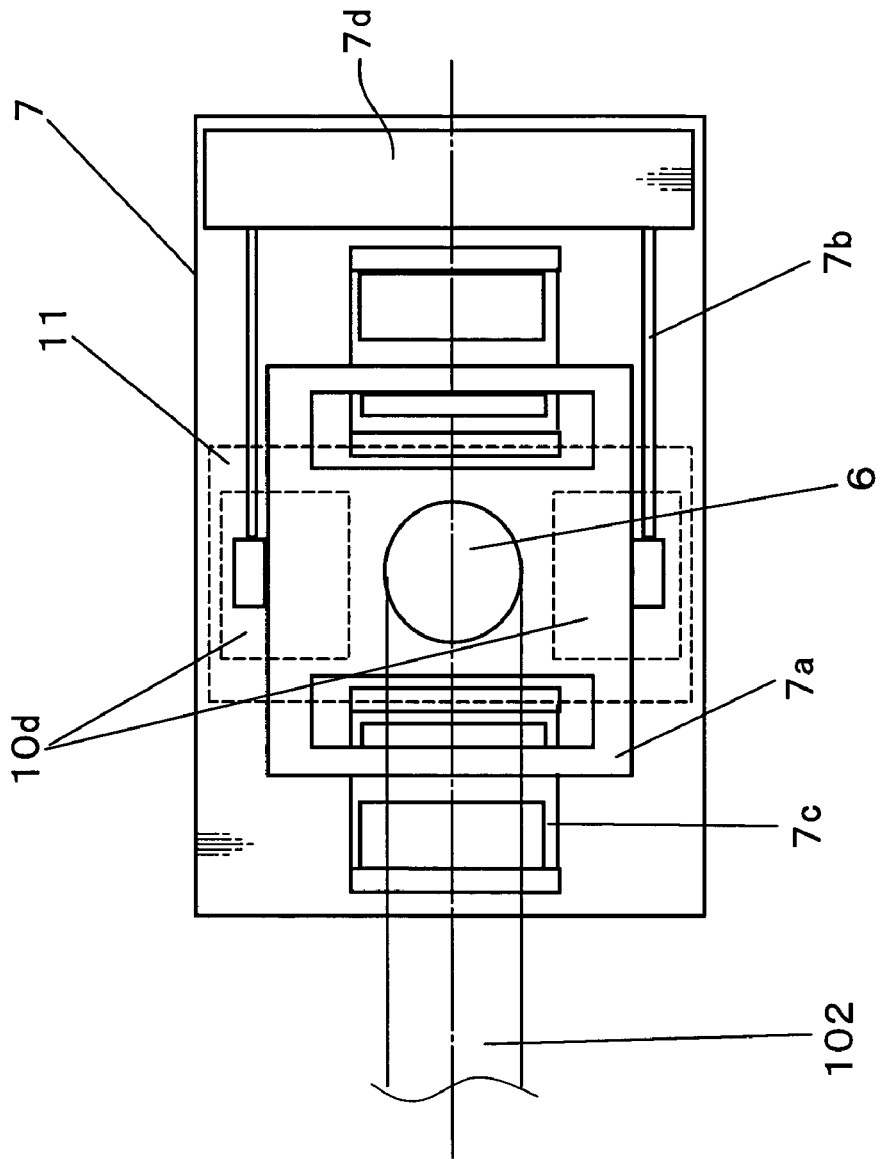
FIG. 8 is a view showing a positional relation between a biaxial actuator and the deformable mirror.

To be more concrete, as is shown in FIG. 8 showing these components when viewed from the dual layer optical disc 20 side, the biaxial actuator 7 serving as an objective lens actuator includes a fixing portion 7d, an objective lens holder 7a connected to the fixing portion 7d via suspension wires 7b in a displaceable manner, and magnetic circuits 7c that provide a driving force to the objective lens holder 7a. The objective lens 6 is held by the objective lens holder 7a. The magnetic circuits 7c are provided on the both sides of the objective lens holder 7a in the optical axis direction of a laser beam 102, and the sub-coils 10d are aligned in a direction orthogonal to the magnetic circuits 7c.

As has been described, in this embodiment, the hard magnetic member 10a is used to attract the magnetic member 5a of the reflection mirror 5. The reflection mirror 5 can be therefore switched to the deformed state from the non-deformed state and vice versa by merely passing a current through the magnetizing coil 10c only at the time of magnetization or demagnetization. It is thus possible to reduce power consumption, and an optical head suitable for use in a mobile device can be achieved.

Moreover, deformation of the reflection mirror 5 is limited by providing the recessed portion 11a in the base 11 provided on the back surface side of the reflection mirror 5, and by causing the reflection mirror 5 to abut on the recessed portion 11a. It is thus possible to maintain a quantity of deformation of the reflection mirror 5 accurately using a simple configuration.

In this embodiment, because the reflection mirror 5 is of an elliptical shape, the reflection mirror 5 is suitably disposed in close proximity to the objective lens.

Also, in this embodiment, it is configured in such a manner that the deformable mirror 15 is assembled by fitting the elastic supporting member 12 to spring-support the reflection mirror 5 into the base 11. The deformable mirror 15 is therefore quite easy to assemble.

A modification of this embodiment will now be described.

Figure 9:
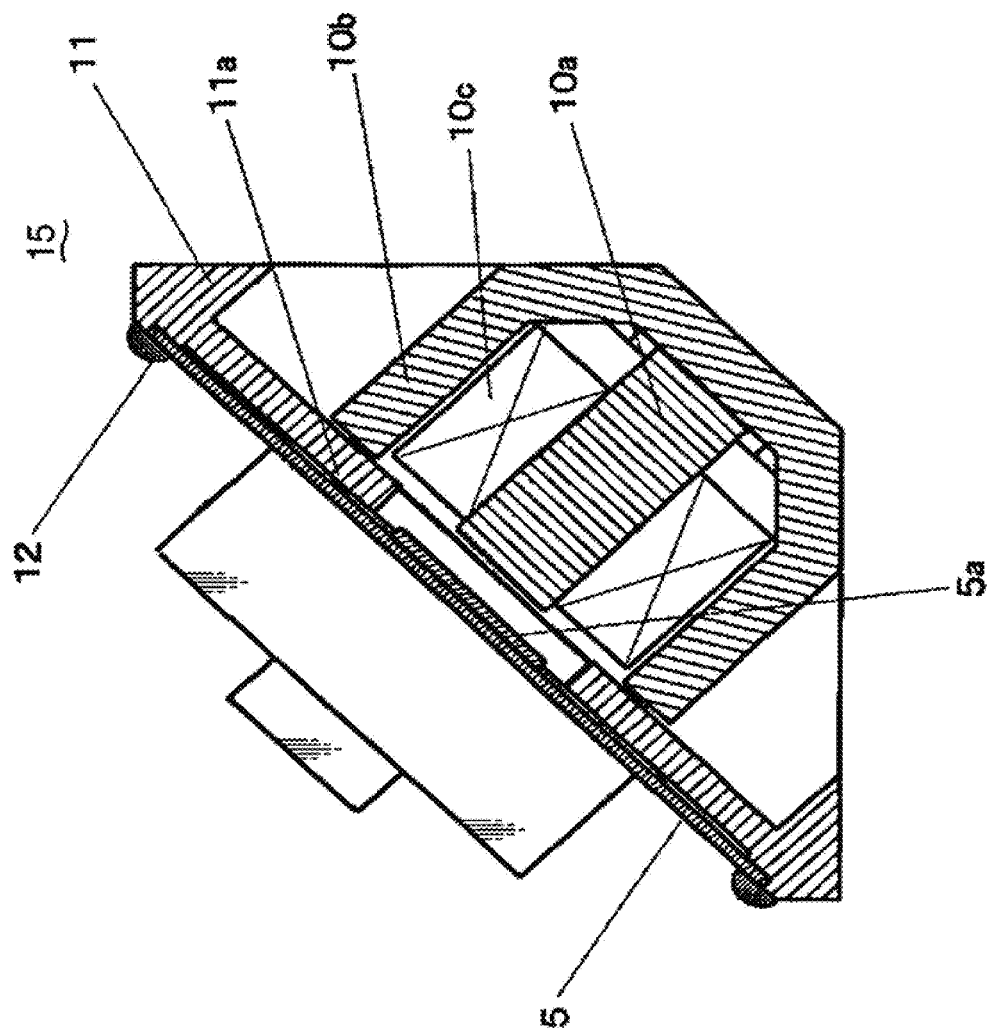
FIG. 9 is a cross section showing another example when an elastic supporting member according to the first embodiment of the invention is made of an adhesive.

FIG. 9 shows another example of the elastic supporting member 12. As is shown in the drawing, the elastic supporting member 12 is made of an adhesive maintaining elasticity after it is cured. The elastic supporting member 12 elastically holds the outer circumferential portion of the reflection mirror 5, and operations same as those of the configuration described above are enabled. In this case, it is preferable to apply the adhesive uniformly to the entire outer circumference of the reflection mirror 5 so that the reflection mirror 5 will have no irregularities in deformation.

An adhesive made of UV-cured resin using denatured acryl as a principal component can be used as the adhesive. In particular, an adhesive that forms a soft hardened material is suitable, and for example, Three Bond 3081B available from 3M can be used.

In this embodiment, the magnetic member 5a is provided to the reflection mirror 5; however, a hard magnetic material may be provided to the reflection mirror instead.

Second Embodiment

A second embodiment of the deformable mirror 15 of the invention will now be described concretely. Like components are labeled with like reference numerals with respect to the first embodiment, and descriptions of such components are omitted herein.

Figure 10:
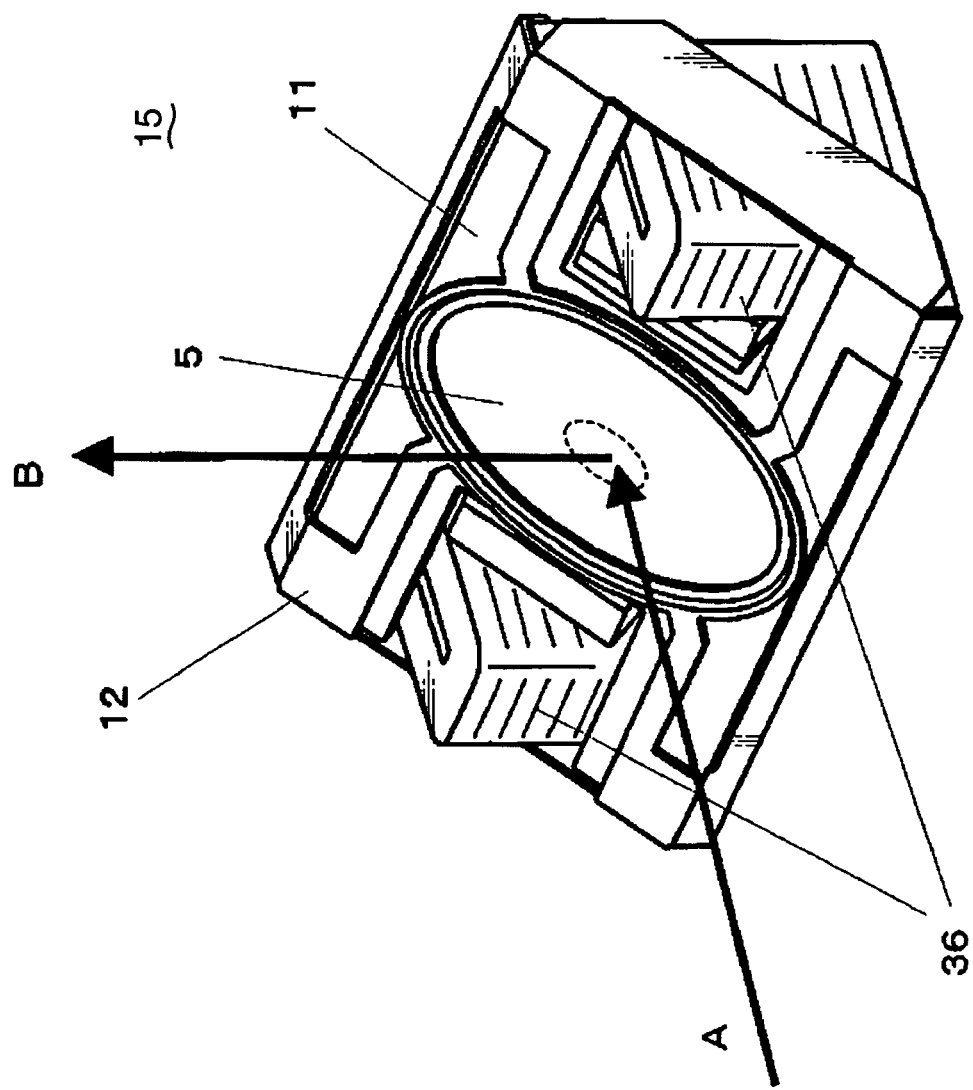
FIG. 10 is a perspective view showing a second embodiment of the deformable mirror of the invention.
Figure 11:
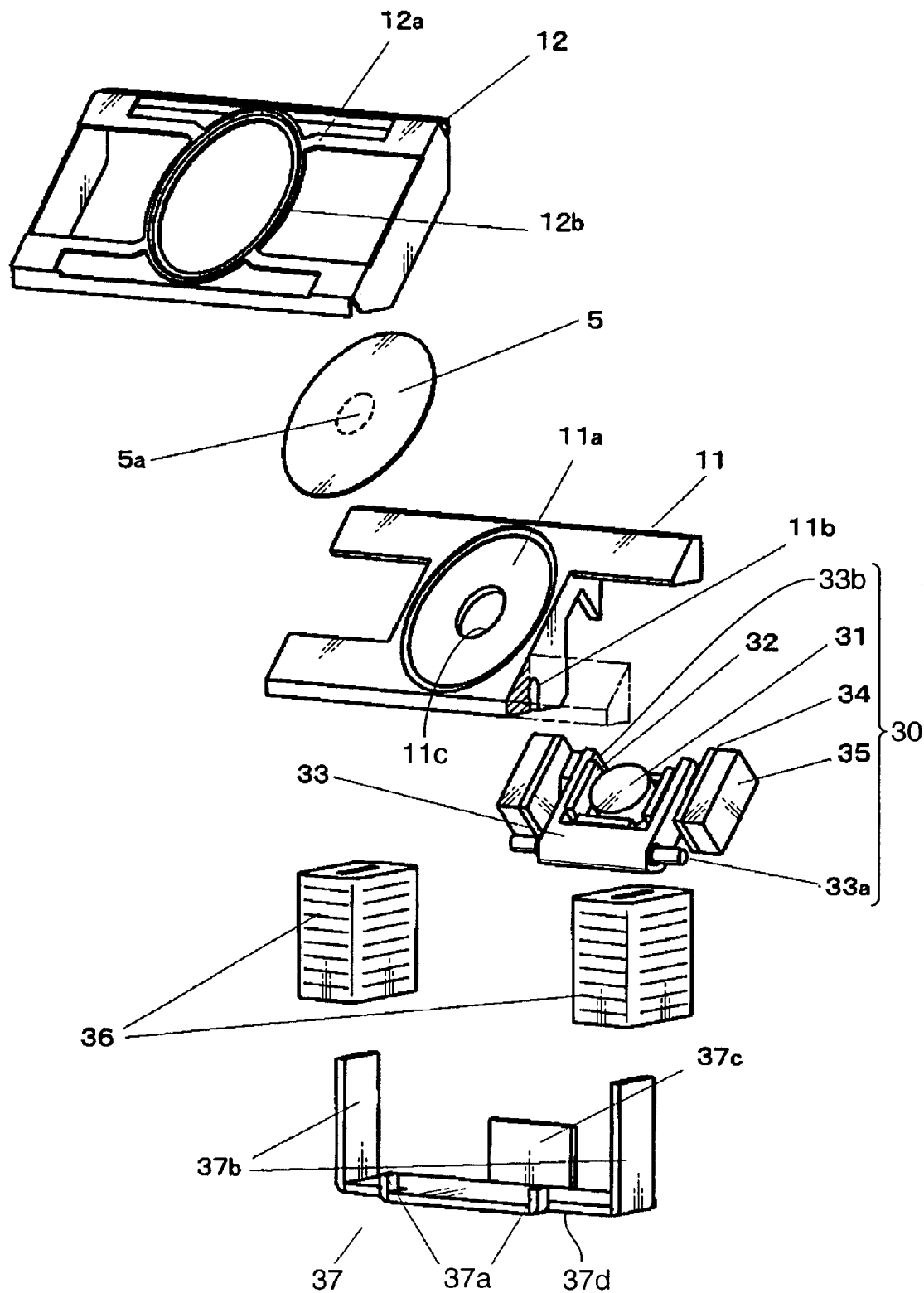
FIG. 11 is a perspective view showing disassembled respective components forming the deformable mirror.

FIG. 10 is a perspective view showing the second embodiment of the deformable mirror 15 of the invention. FIG. 11 is a perspective view showing respective disassembled components. The reflection mirror 5, the base 11, and the elastic supporting member 12 are of the same configurations as their counterparts in the first embodiment.

As are shown in FIG. 10 and FIG. 11, the base 11 is provided with axial grooves 11b, and a movable portion 30 supported rotatably on the axial groove 11b is incorporated into the base 11.

The movable portion 30 includes a movable portion base 33, driving yokes 34, and driving magnets 35.

The movable portion base 33 is provided with a large rectangular concave portion 33b at the center. Rotational axes 33a are provided on the both sides of the movable portion base 33. The rotational axes 33a extend in a direction parallel to the top surface of the base 11 at positions shifted from the through-hole 11c made in the top surface of the base 11, and the rotational axes 33a are inserted into the axis grooves 11b. The movable portion base 33 is thereby allowed to rotate about the rotational axes 33a. In other words, the movable portion base 33 is supported rotatably on the base 11.

The driving yokes 34 and the driving magnets 35 are fixed to the tip ends of arm portions located on the both sides of the rectangular concave portion 33b. These components together form a rotational portion that rotates about the rotational axes 33a of the movable portion base 33.

A permanent magnet 31 and a rotational portion yoke 32 are provided inside the rectangular concave portion 33b. The permanent magnet 31 is fixed to the rotational portion yoke 32, and the rotational portion yoke 32 is attached to the movable portion base 33. Hence, the permanent magnet 31 is supported on the movable portion base 33, and the permanent magnet 31 and the rotational portion yoke 32 are allowed to move about the rotational axes 33a integrally with the movable portion base 33.

A fixing yoke 37 is provided at the bottom of the base 11. The fixing yoke 37 comprises a bottom portion 37d, supporting protrusions 37a connected to the bottom portion 37d, erect portions 37b that stand upright from the both end of the bottom portion 37d, and a protrusion portion 37c that stands upright from the bottom portion 37d on the back surface side. The supporting protrusions 37a support the rotation axes 33a from below by forcing the rotational axes 33a into the axis grooves 11b. Driving coils 36 are attached to the respective erect portions 37b. The protrusion portion 37c extends upward from the lower end of the base 11 along the back surface portion.

Figure 12:
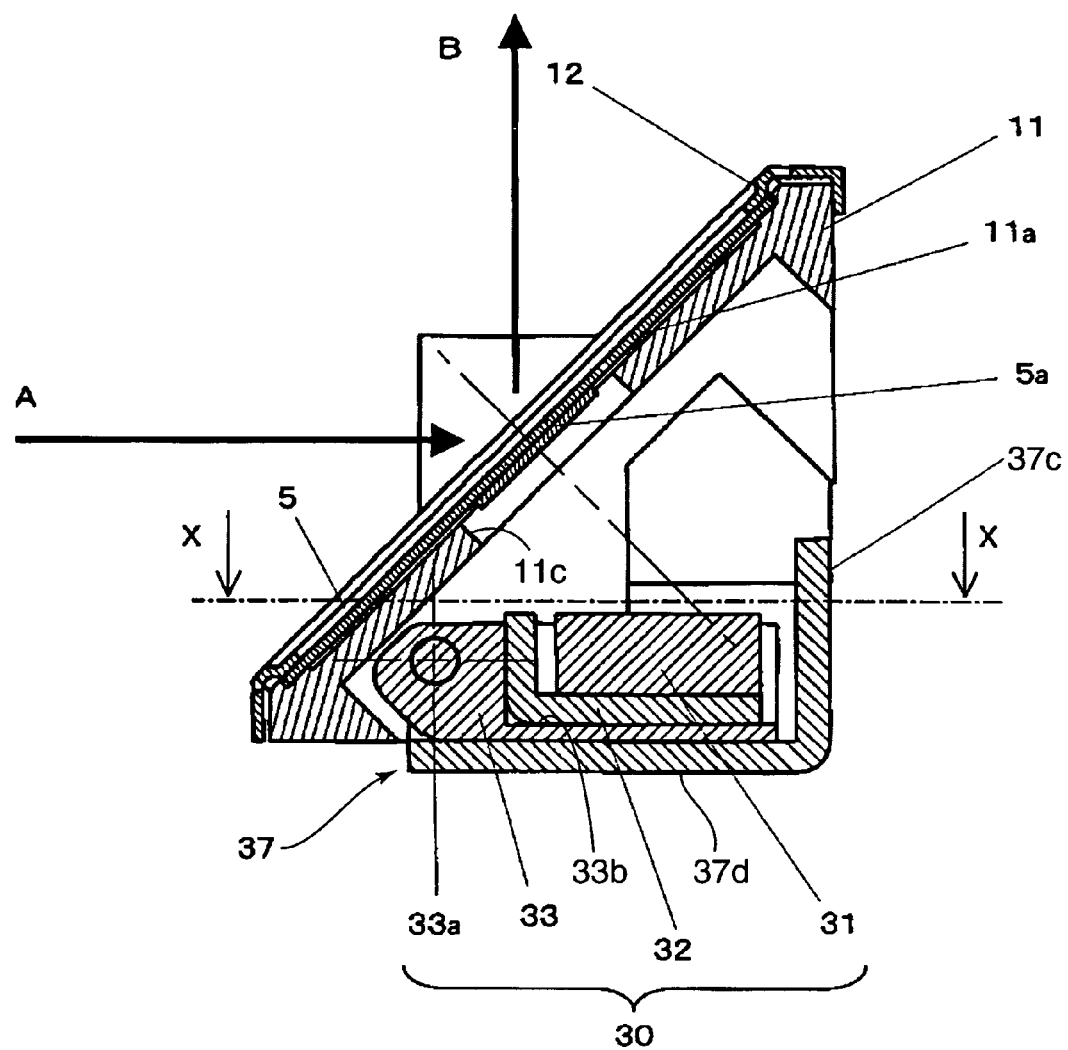
FIG. 12 is a sectional side elevation showing an internal configuration of the deformable mirror.
Figure 13:
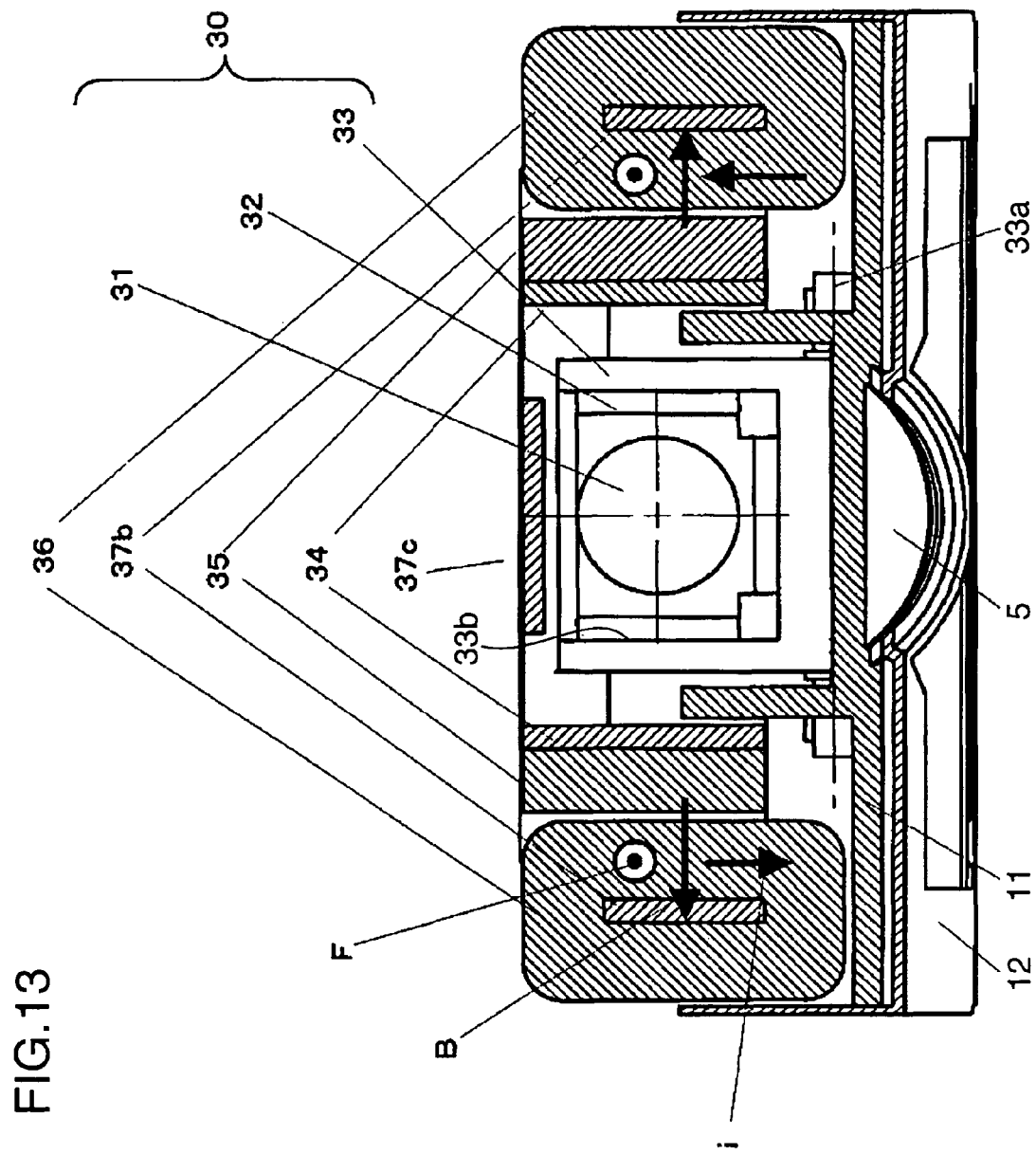
FIG. 13 is a cross section taken along the line X-X of FIG. 12.

FIG. 12 is a sectional side elevation showing the internal configuration of the second embodiment. FIG. 13 is a cross section of a plane taken along the line X-X of FIG. 12.

As is shown in FIG. 12, the permanent magnet 31 is present at a second position when the movable portion 30 is in a horizontal state. At the second position, the permanent magnet 31 is present on a side of the rotational axes 33a, and under these conditions, the permanent magnet 31 is present closer to the protrusion portion 37c of the fixing yoke 37 than the magnetic member 5a on the back surface of the reflection mirror 5. The permanent magnet 31 is attracted toward the protrusion portion 37c of the fixing yoke 37, and the magnetic member 5a is unsusceptible to an attraction force induced from the permanent magnet 31.

As is shown in FIG. 13, each of the driving magnets 35 provided to the both side portions of the movable portion 30 is disposed between the driving yoke 34 and the erect portion 37b of the fixing yoke 37. Driving coils 36 are disposed in magnetic gaps in which gap fluxes B are generated. It is thus configured in such a manner that when a current is passed through each driving coil 36, a current i acts on the flux B, thereby inducing an upward driving force F.

When the driving force F exceeds an attraction force induced between the permanent magnet 31 and the protrusion portion 37c, the movable portion 30 starts to rotate upward against the attraction force.

Figure 14:
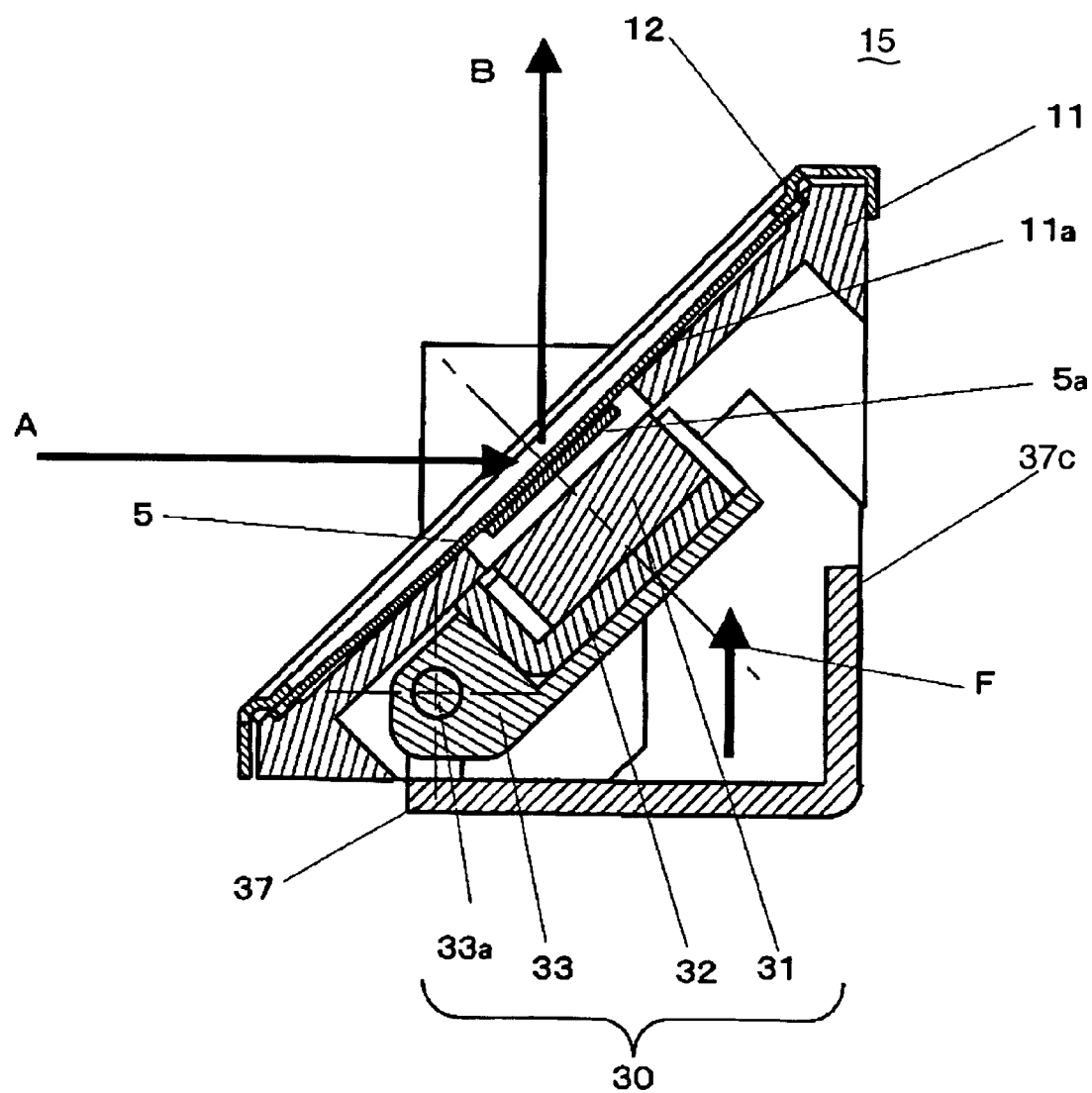
FIG. 14 is a view corresponding to FIG. 12 and showing a state where a movable portion is located on the upper side in the deformable mirror.

FIG. 14 is a sectional side elevation showing a state where the movable portion 30 is located on the upper side.

Referring to FIG. 14, the permanent magnet 31 is in close proximity to the magnetic member 5a on the back surface of the reflection mirror 5. An attraction force is exerted between the permanent magnet 31 and the magnetic member 5a, and the permanent magnet 31 is located at a first position at which the movable portion yoke 32 is kept abutting on the inner surface of the base 11. At the first position, the permanent magnet 31 is positioned in the back of the magnetic member 5a of the reflection mirror 5.

At the same time, the magnetic member 5a is attracted toward the permanent magnet 31 due to the attraction force, and the reflection mirror 5 is thereby deformed in the shape of a concave surface. A quantity of deformation is limited as the back surface of the reflection mirror 5 abuts on the recessed portion 11a in the base 11.

When a current is passed through the driving coils 36 inversely under these conditions, a downward driving force is induced in contrast to the description above. When the driving force outperforms the attraction force toward the magnetic member 5a, the movable portion 30 is driven to rotate downward, and returns to the state at the second position of FIG. 12.

In other words, the movable portion 30 is attracted toward the magnetic member 5a when it is located on the upper side, and attracted toward the protrusion portion 37c when it is located on the lower side while maintaining its posture in each state. It is thus sufficient to pass a current through the driving coils 36 only when the position of the movable portion 30 is changed.

When configured in this manner, spherical aberration caused by a difference in thickness of the light-transmitting layer can be corrected by merely passing a current through the driving coils 36 for a short time when the two layers are switched at the time of recording/playback of information in/from a dual layer disc.

Moreover, in the second embodiment, the movable portion 30 is formed to move by rotation between the first position and the second position, the configuration to switch the two positions can be achieved through a simple configuration.

Also, as in the first embodiment, the driving coils 36 and the fixing yoke 37 are provided on the both sides of the reflection mirror 5, and positioned below the bottom portion of the biaxial actuator 7 of the objective lens 6 provided above. Hence, by forming the deformable mirror 15 in a size comparable to the biaxial actuator 7 in width, the optical head will not be increased in size.

The second embodiment is configured in such a manner that the movable portion 30 provided with the permanent magnet 31 is allowed to rotate. However, the invention is not limited to this configuration. For example, the movable portion may undergo parallel translation in a direction perpendicular to the reflection mirror 5 or may undergo parallel translation in a plane direction of the reflection mirror 5. Even when configured as described above, the same advantages can be achieved, because a distance between the permanent magnet 31 and the magnetic member 5a on the back surface of the reflection mirror 5 varies.

Descriptions of the other configurations, functions, and advantages are omitted herein, because they are the same as those in the first embodiment.

Third Embodiment

A third embodiment of the deformable mirror 15 of the invention will now be described. Like components are labeled with like reference numerals with respect to the first embodiment, and descriptions of these components are omitted herein.

Figure 15:
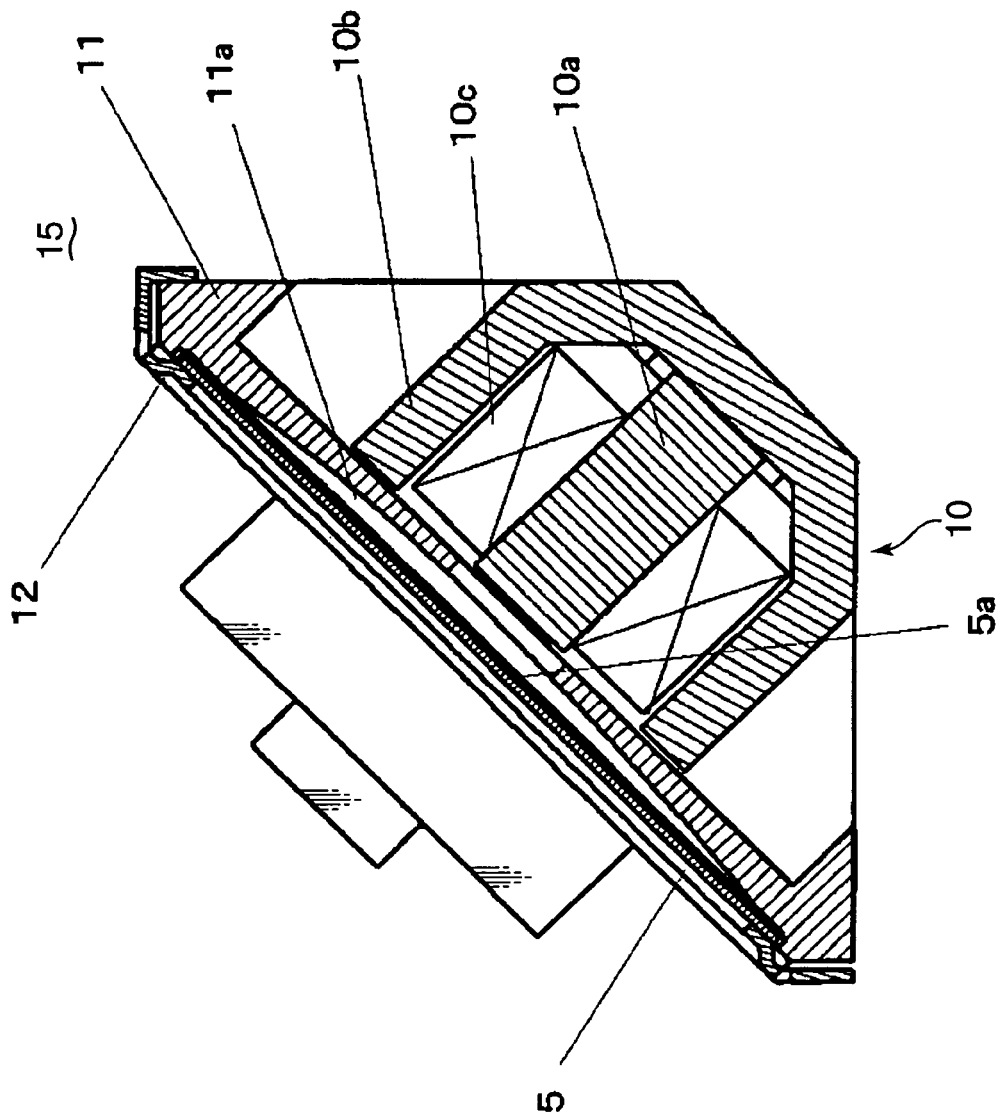
FIG. 15 is a cross section showing a third embodiment of the deformable mirror of the invention.

FIG. 15 is a cross section showing the third embodiment of the deformable mirror 15 of the invention. As is shown in the drawing, the magnetic member 5a is provided across the entire back surface of the base member 5b forming the reflection mirror 5, so that the attraction force is exerted across the entire surface. Meanwhile, the recessed portion 11a in the base 11 is formed in the shape of a concave curved surface that coincides with deformation of the reflection mirror 5.

When configured in this manner, the attraction area is enlarged in comparison with a case where the magnetic member 5a is provided at the center of the reflection mirror 5 alone. Hence, even when the provided gap flux density is the same, it is possible to obtain a larger attraction force as a whole. In addition, because the reflection mirror 5 deforms to the shape of the curved surface of the recessed portion 11a, processing at high accuracy is needed to form the curved surface of the recessed portion 11a; however, the reflection mirror 5 can be deformed at high accuracy when aberration has to be corrected more precisely.

FIG. 15 shows the switching device 10 configured in the same manner as the counterpart in the first embodiment. However, the invention is not limited to this configuration, and the switching device 10 can be configured in the same manner as the counterpart in the second embodiment.

In this embodiment, the reflection mirror 5 is formed by applying the reflection coating on the base member 5b comprising a glass substrate. However, the base member of the reflection mirror 5 in itself can be made of a ferromagnetic material. For example, a reflection mirror may be formed by mirror-polishing the surface of a 0.1-mm-thick magnetic stainless steel plate, and by applying a reflection coating. Then, deformation such that causes the apex to be displaced by about 4 μm is achieved at an attraction force of 0.294 to 0.392 N (30 to 40 gf).

When configured in this manner, the reflection coating serves also as a rust prevention coating, and the process of bonding, vapor deposition, etc. can be omitted. It is thus possible to manufacture the deformable mirror 15 at the low cost. Moreover, because the reflection mirror 5 is more resistant to breaking, there is an advantage that it can be handled more readily than the glass substrate.

In this embodiment, the switching devices are provided on the both sides of the reflection mirror 5. However, the switching device may be provided on one side alone.

The other configurations, functions, and advantages are the same as those in the first embodiment.

Fourth Embodiment

Figure 16:
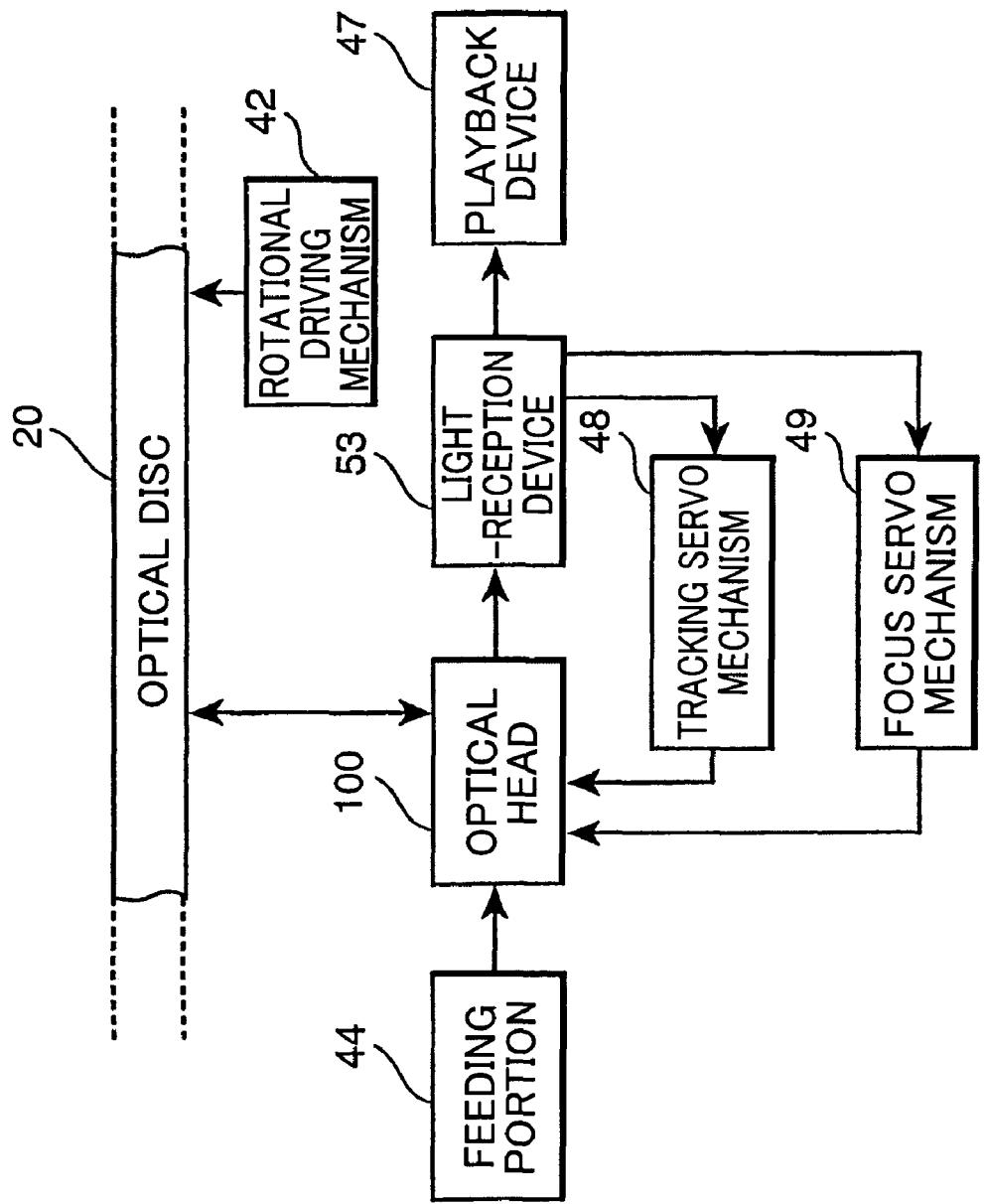
FIG. 16 is a view schematically showing the configuration of an optical recording and playback device according to a fourth embodiment of the invention.

FIG. 16 schematically shows an optical recording and playback device according to a fourth embodiment of the invention. The optical recording and playback device includes the optical head 100 according to the first embodiment, a rotational driving mechanism 42, a feeding portion 44, a light-reception device 53, a playback device 47, a tracking servo mechanism 48, and a focus servomechanism 49.

The optical head 100 may be replaced with the one according to the second or third embodiment.

The optical recording and playback device performs recording, erasing, and reading of information using light that comes out from the objective lens 6 in the optical head 100 and converges on the recording surface of the dual layer optical disc 20.

The rotational driving mechanism 42 includes a motor (not shown), and drives the optical disc 20 inserted in the shaft to rotate.

The feeding portion 44 supplies power to the optical head 100, the rotational driving mechanism 42, and the like. The feeding portion 44 is configured to apply a pulse of voltage to the switching device 10 in the optical head 100.

The light-reception device 53 generates a playback signal, a tracking error signal, and a focus error signal on the basis of reflected light branched in the optical head 100.

The playback device 47 plays back information recorded on the optical disc 20 on the basis of a playback signal, and when the information is, for example, video information and sound information, it converts the information into a video signal and a sound signal, respectively. The tracking servo mechanism 48 controls the optical head 100 to compensate for a tracking error on the basis of a tracking error signal. Likewise, the focus servo mechanism 49 controls the optical head 100 to compensate for a focus error on the basis of a focus error signal.

The optical recording and playback device maintains the reflection mirror 5 as a plane mirror when light is collected on the first recording layer 21 farther from the light-incident surface in the optical recording and playback medium 20 having two recording layers (see FIG. 2), and deforms the reflection mirror 5 in the shape of a concave surface by means of the switching device 10 when light is collected on the second recording layer 22 closer to the light-incident surface (FIG. 3). In this instance, the shape of the reflection mirror 5 is changed in the manner described above as a pulse of voltage is applied only when the shape of the reflection mirror 5 needs to be changed.

This application is based on Japanese patent application serial No. 2003-376857, filed in Japan Patent Office on Nov. 6, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

As has been described, the invention is useful as a deformable mirror that includes a deformable reflection mirror and switches the reflection mirror to the deformed state from the non-deformed state and vice versa, and also as an optical head and an optical recording and playback device, each of which includes the deformable mirror and records information in and plays back information from a dual layer disc by correcting spherical aberration.

The invention claimed is:

1. A deformable mirror comprising:
a reflection mirror having a reflection surface on which light is reflected, at least part of the reflection mirror being made of a ferromagnetic member, the reflection mirror having a deformed state and a non-deformed state; and
a switching device that switches the reflection mirror between the deformed state and the non-deformed state using a magnetic force, the switching device having a hard magnetic member made of a hard magnetic material and a magnetizing unit including a magnetizing coil,
wherein a current is passed through the switching device by a driving circuit,
wherein the magnetizing unit is (i) capable of applying current to the magnetizing coil so that the hard magnetic member enters a state in which the hard magnetic member is magnetized and (ii) capable of applying current to the magnetizing coil so that the hard magnetic member, when in the state in which the hard magnetic member is magnetized, enters a state in which the hard magnetic member is demagnetized, and
wherein the current is applied by the driving circuit to the magnetizing coil of the switching device only when the reflection mirror is switched between the deformed state and the non-deformed state.

2. The deformable mirror according to claim 1, wherein:
the reflection mirror is switched into the deformed state by attracting the ferromagnetic member in the reflection mirror when the hard magnetic member is magnetized by the magnetizing unit, and the reflection mirror is switched into the non-deformed state when the hard magnetic member is demagnetized by the magnetizing unit.

3. The deformable mirror according to claim 1, wherein:
the magnetizing unit includes a yoke and a sub-coil.

4. The deformable mirror according to claim 3, wherein:
the reflection mirror includes a back surface and a side portion; and
at least part of the sub-coil and the yoke are disposed on the back surface and the side portion of the reflection mirror.

5. The deformable mirror according to claim 3, wherein:
the ferromagnetic member and the yoke form part of a magnetic circuit.

6. The deformable mirror according to claim 1, wherein:
the reflection mirror includes a base member comprising a glass plate; and
the ferromagnetic member is provided to at least part of the base member.

7. The deformable mirror according to claim 6, wherein:
the reflection surface comprises a reflection coating provided on a surface of the base member.

8. The deformable mirror according to claim 7, wherein:
the reflection coating comprises a dielectric multi-layer film.

9. The deformable mirror according to claim 7, wherein:
the reflection coating is provided on each of the surfaces of the base member.

10. The deformable mirror according to claim 7, wherein:
the reflection coating is provided on one surface of the base member; and
a counter coating is formed on another surface of the base member, the counter coating having a coefficient of thermal expansion that is the same as a coefficient of thermal expansion of the reflection coating.

11. The deformable mirror according to claim 1, wherein:
the reflection mirror includes a base member comprising a ferromagnetic plate material.

12. The deformable mirror according to claim 1, wherein:
the ferromagnetic member is made of a hard magnetic material.

13. The deformable mirror according to claim 1, further comprising:
a base; and
a holding member supported on the base,
wherein the reflection mirror is held elastically by the holding member, and the switching device is incorporated into the base.

14. The deformable mirror according to claim 13, wherein:
the base is provided with a recessed portion that is recessed in a deforming direction of the reflection mirror; and
the reflection mirror is configured to be held such that the recessed portion of the base is covered, and, when the reflection mirror is in the deformed state, the reflection mirror is maintained in the deformed state by abutting on the recessed portion.

15. The deformable mirror according to claim 14, wherein:
the reflection mirror is almost elliptical in shape; and
the recessed portion of the base is almost elliptical in shape corresponding to the almost elliptical shape of the reflection mirror.

16. The deformable mirror according to claim 13, wherein:
the holding member presses the reflection mirror toward the base with a spring force.

17. The deformable mirror according to claim 16, wherein:
the holding member includes a base portion incorporated into the base, a blade spring portion extending from the base portion, and a presser frame portion connected to the blade spring portion and pressing down on the reflection mirror.

18. The deformable mirror according to claim 13, wherein:
the holding member is made of an elastic adhesive.

19. An optical head configured to concentrate light on an optical information recording medium, the optical head comprising:
an objective lens that concentrates light on the optical information recording medium;
an objective lens actuator that drives the objective lens; and
a deformable mirror disposed to reflect light emitted from a light source toward the objective lens,
the deformable mirror including:
a reflection mirror having a reflection surface on which light is reflected, at least part of the reflection mirror being made of a ferromagnetic member, the reflection mirror having a deformed state and a non-deformed state; and
a switching device that switches the reflection mirror between the deformed state and the non-deformed state using a magnetic force, the switching device having a hard magnetic member made of a hard magnetic material and a magnetizing unit including a magnetizing coil,
wherein a current is passed through the switching device by a driving circuit,
wherein the magnetizing unit is (i) capable of applying current to the magnetizing coil so that the hard magnetic member enters a state in which the hard magnetic member is magnetized and (ii) capable of applying current to the magnetizing coil so that the hard magnetic member, when in the state in which the hard magnetic member is magnetized, enters a state in which the hard magnetic member is demagnetized, and
wherein the current is applied by the driving circuit to the magnetizing coil of the switching device only when the reflection mirror is switched between the deformed state and the non-deformed state.

20. The optical head according to claim 19, wherein:
the deformable mirror is provided in a space below the objective lens actuator.

21. An optical recording and playback device that concentrates light on an optical recording and playback medium having two recording layers and performs at least one of recording information in and reading recorded information from the optical recording and playback medium, the optical recording and playback device comprising:
an optical head; and
a feeding portion that supplies the optical head with power,
the optical head configured to concentrate light on an optical recording and playback medium, the optical head including:
an objective lens that concentrates light on the optical recording and playback medium;
an objective lens actuator that drives the objective lens; and
a deformable mirror disposed to reflect light emitted from a light source toward the objective lens,
the deformable mirror including:
a reflection mirror having a reflection surface on which light is reflected, at least part of the reflection mirror being made of a ferromagnetic member, the reflection mirror having a deformed state and a non-deformed state; and
a switching device that switches the reflection mirror between the deformed state and the non-deformed state using a magnetic force, the switching device having a hard magnetic member made of a hard magnetic material and a magnetizing unit including a magnetizing coil,
wherein the magnetizing unit is (i) capable of applying current to the magnetizing coil so that the hard magnetic member enters a state in which the hard magnetic member is magnetized and (ii) capable of applying current to the magnetizing coil so that the hard magnetic member, when in the state in which the hard magnetic member is magnetized, enters a state in which the hard magnetic member is demagnetized, and
wherein the feeding portion supplies the optical head with the power needed to switch the states of the reflection mirror only when the reflection mirror is switched between the deformed state and the non-deformed state.

22. The optical recording and playback device according to claim 21, wherein:
the deformable mirror uses the reflection mirror as a plane mirror when light is concentrated on a first recording layer farther from a light-incident surface of the optical recording and playback medium, and deforms the reflection mirror to be a concave mirror with the reflection surface forming a concave surface when light is concentrated on a second recording layer closer to the light-incident surface of the optical recording and playback medium.

23. The optical recording and playback device according to claim 21, wherein:
the feeding portion applies a pulse of voltage only when the states of the reflection mirror are switched.

* * * * *